United States Patent
Ishikawa

(10) Patent No.: US 11,491,953 B2
(45) Date of Patent: Nov. 8, 2022

(54) MOBILE DEVICE AND ELECTRONIC KEY SYSTEM FOR WIRELESS COMMUNICATION WITH VEHICLE DEVICE

(71) Applicant: DENSO CORPORATION, Kariya (JP)

(72) Inventor: Ryusuke Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 201 days.

(21) Appl. No.: 16/936,066

(22) Filed: Jul. 22, 2020

(65) Prior Publication Data

US 2020/0346619 A1 Nov. 5, 2020

Related U.S. Application Data

(63) Continuation of application No. PCT/JP2018/044456, filed on Dec. 4, 2018.

(30) Foreign Application Priority Data

Jan. 29, 2018 (JP) .............................. JP2018-012557

(51) Int. Cl.
*H01M 10/46* (2006.01)
*B60R 25/40* (2013.01)
*H02J 50/80* (2016.01)
*H02J 50/12* (2016.01)
*H04W 4/40* (2018.01)
*H02J 7/00* (2006.01)
*B60R 25/24* (2013.01)
(Continued)

(52) U.S. Cl.
CPC ............ *B60R 25/406* (2013.01); *B60R 25/24* (2013.01); *E05B 81/80* (2013.01); *H02J 7/00032* (2020.01); *H02J 7/0048* (2020.01); *H02J 7/02* (2013.01); *H02J 50/12* (2016.02); *H02J 50/80* (2016.02); *H04W 4/40* (2018.02)

(58) Field of Classification Search
CPC ........ H02J 7/00032; H02J 7/0048; H02J 7/02; H02J 50/80; H02J 50/12; H02J 50/005; B60R 25/406; B60R 25/24; B60R 25/40; E05B 81/80; E05B 81/88; H04W 4/80; H04W 4/40
USPC ................................. 320/107, 108, 114, 115
See application file for complete search history.

(56) References Cited

FOREIGN PATENT DOCUMENTS

| GB | 2592851 A | * | 9/2021 | ............ B60R 25/24 |
| JP | 2012052407 A | | 3/2012 | |
| JP | 5400407 B2 | | 1/2014 | |

* cited by examiner

*Primary Examiner* — Edward Tso
(74) *Attorney, Agent, or Firm* — Harness, Dickey & Pierce, P.L.C.

(57) ABSTRACT

A mobile device wirelessly communicates with a vehicle device. The mobile device includes a receiving unit, a response signal generation unit, a transmission unit, a charging unit, and a charge state determination unit. The receiving unit receives a response request signal transmitted from the vehicle device. The response signal generation unit generates a response signal in response to the response request signal. The transmission unit transmits the response signal. The charging unit charges a built-in battery with an electric power supplied wirelessly or through wire from a power supply device. The charge state determination unit determines whether the charging unit charges the built-in battery. The mobile device is configured not to transmit the response signal, in a situation where the charge state determination unit determines that the charging unit is charging the built-in battery.

8 Claims, 11 Drawing Sheets

(51) Int. Cl.
*E05B 81/80* (2014.01)
*H02J 7/02* (2016.01)

MOBILE DEVICE AND ELECTRONIC KEY SYSTEM FOR WIRELESS COMMUNICATION WITH VEHICLE DEVICE

CROSS REFERENCE TO RELATED APPLICATIONS

The present application is a continuation application of International Patent Application No. PCT/JP2018/044456 filed on Dec. 4, 2018, which designated the U.S. and claims the benefit of priority from Japanese Patent Application No. 2018-012557 filed on Jan. 29, 2018. The entire disclosures of all of the above applications are incorporated herein by reference.

TECHNICAL FIELD

The present disclosure relates to a mobile device and a vehicle electronic key system.

BACKGROUND

A vehicle electronic key system may include a vehicle device mounted on a vehicle and a mobile device (may also be referred to as a smart key) carried by a user. The vehicle device and the mobile device may perform an authentication process by a wireless communication, and the vehicle device may execute a vehicle control such as vehicle door locking and unlocking and engine starting based on a success of the authentication process.

SUMMARY

The present disclosure describes a mobile device configured to wirelessly communicate with a vehicle device mounted on a vehicle, and a vehicle electronic key system including the mobile device and the vehicle device.

BRIEF DESCRIPTION OF DRAWINGS

The present disclosure will become more apparent from the following detailed description made with reference to the accompanying drawings. In the drawings.

DETAILED DESCRIPTION

Figure 1:
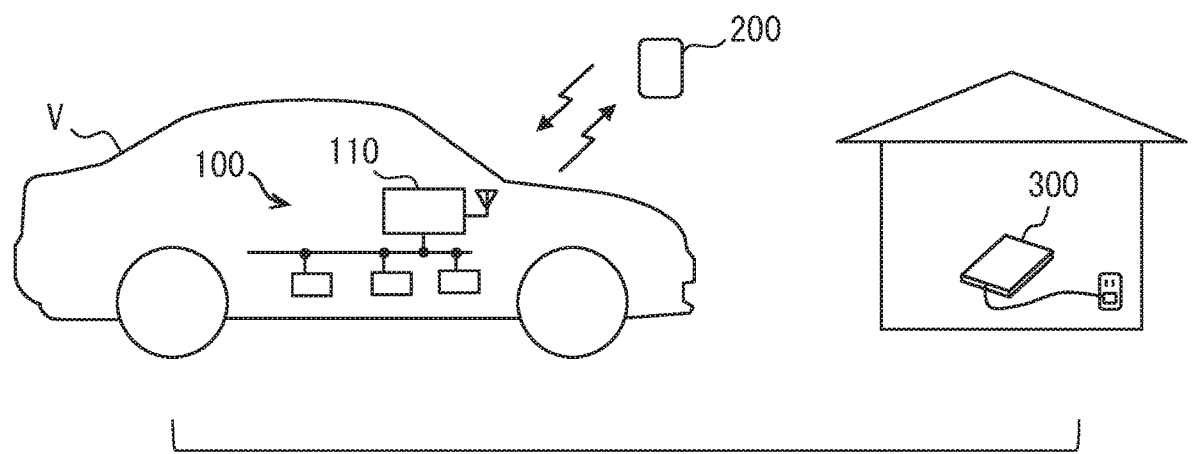
FIG. 1 is a block diagram showing a schematic configuration of a vehicle electronic key system.

In a vehicle electronic key system, the coverage of a radio signal transmitted by a vehicle device may be limited to a short distance around the vehicle, because the vehicle device performing the wireless communication with the mobile device is limited to a situation in which the mobile device is present in the vicinity of the vehicle.

However, in the vehicle electronic key system described above, a third party may indirectly establish a communication between the mobile device and the vehicle device by use of a repeater (may also be referred to as a relay device) that copies, converts, and amplifies radio waves used in the vehicle electronic key system, resulting in a concern of a relay attack that illegally establishes authentication of the mobile device by the vehicle device. If the relay attack succeeds, the vehicle control such as unlocking the vehicle door or starting the engine is executed even though an authorized user does not intend to execute the vehicle control. The third party is a person other than the user of the vehicle who does not have the mobile device.

For preventing such a relay attack, the vehicle device of the vehicle electronic key system may transmit a radio signal including two types of power levels having a high level and a low level, a mobile device may sequentially detect a strength of a received signal (referred to as RSSI: received signal strength indication), and the mobile device may return the signal to the vehicle device only when the mobile device detects a change in strength of a predetermined level or higher in the received signal.

The mobile devices have become more multi-functional, and some of the mobile devices are becoming widespread in use which are configured to provide a display to be able to display various types of vehicle information such as a battery level, a fuel level, a distance to empty, and the like.

With regard to the configuration described above, it may be possible that the relay attack may not be prevented and the authentication may succeed, when even a change in a signal strength of a transmission signal is reproduced by the repeater. As a result, there is a possibility that the vehicle is used illegally.

As a situation in which the user receives such a relay attack, for example, there is a situation in which the user stays at home and the vehicle is parked in a parking lot in the vicinity of the home. As described above, if the mobile device becomes more sophisticated, a chance of charging a built-in battery of the mobile device at home or the like might also increase.

According to a first aspect of the present disclosure, a mobile device is configured to wirelessly communicate with a vehicle device mounted on a vehicle. The mobile device includes a receiving unit, a response signal generation unit, a transmission unit, a charging unit, and a charge state determination unit. The receiving unit is configured to receive a response request signal transmitted from the vehicle device by adopting a radio wave at a predetermined vehicle transmission frequency. The response signal generation unit is configured to generate a response signal in response to the response request signal based on the response request signal received by the receiving unit. The transmission unit is configured to transmit the response signal generated by the response signal generation unit. The charging unit is configured to charge a built-in battery with an electric power supplied wirelessly or through wire from a power supply device. The charge state determination unit is configured to determine whether the charging unit charges the built-in battery. The mobile device is configured not to transmit the response signal, in a situation where the charge state determination unit determines that the charging unit is charging the built-in battery.

According to the first aspect of the present disclosure, while the user charges the mobile device at home or the like, the mobile device does not return a response signal in response to a response request signal from the vehicle device. Even if the user stays at home and the vehicle is parked at home or in a parking lot in the vicinity of home, the possibility of unauthorized use of the vehicle may be reduced even if the user receives a relay attack.

According to a second aspect of the present disclosure, a vehicle electronic key system includes a vehicle device mounted on a vehicle, and a mobile device associated with the vehicle device and carried by a user of the vehicle. The vehicle device performs a predetermined vehicle control on the vehicle based on the success of the authentication process by a wireless communication between the vehicle device and the mobile device.

The mobile device includes a receiver, a response signal generator, a transmitter, a charger, and a charge state determiner. The receiver is configured to receive a response request signal transmitted from the vehicle device. The response signal generator is configured to generate a response signal in response to the response request signal based on the response request signal received by the receiver. The transmitter is configured to transmit the response signal generated by the response signal generator. The charger is configured to charge a built-in battery with an electric power supplied wirelessly or through wire from a power supply device. The charge state determiner is configured to determine whether the charger is charging the built-in battery.

The vehicle device includes a vehicle-side transmitter, a vehicle-side receiver, an in-vehicle charger, and a power transmission controller. The vehicle-side transmitter is configured to transmit a signal, which includes the response request signal and is directed to the mobile device. The vehicle-side receiver is configured to receive the response signal. The in-vehicle charger is configured as the power supply device. The power transmission controller is configured to detect whether the in-vehicle charger is supplying the electric power to the mobile device, and transmit a vehicle charge notification signal toward the mobile device in cooperation with the vehicle-side transmitter, in response to detecting that the in-vehicle charger is supplying the electric power to the mobile device. The vehicle charge notification signal indicates that the power supply device is the in-vehicle charger.

In a situation where the charge state determiner of the mobile device determines that the charger is charging the built-in battery, the charge state determiner of the mobile device is further configured to identify whether the power supply device is the in-vehicle charger based on the vehicle charge notification signal transmitted from the vehicle device. The mobile device is configured to: transmit the response signal in a situation where the charge state determiner determines that the power supply device is the in-vehicle charger and determines that the charger is charging the built-in battery; and not to transmit the response signal in a situation where the charge state determiner determines that the power supply device is not the in-vehicle charger.

According to the second aspect of the present disclosure, while the user charges the mobile device at home or the like, the mobile device does not return a response signal in response to a response request signal from the vehicle device. Even if the user stays at home and the vehicle is parked at home or in a parking lot in the vicinity of home, the possibility of unauthorized use of the vehicle can be reduced.

According to a third aspect of the present disclosure, a mobile device is configured to wirelessly communicate with a vehicle device mounted on a vehicle. The mobile device is configured to wirelessly communicate with a vehicle device mounted on a vehicle. The mobile device includes a processor and a memory storing a program. When the memory is executed by the processor, the memory causes the processor to: receive a response request signal transmitted from the vehicle device by adopting a radio wave at a predetermined vehicle transmission frequency; generate a response signal in response to the response request signal based on the response request signal; transmit the response signal; charge a built-in battery with an electric power supplied wirelessly or through wire from a power supply device; and determine whether the charging unit charges the built-in battery. The mobile device is configured not to transmit the response signal, in response to determining that the charging unit is charging the built-in battery.

The following describes embodiments of the present disclosure with reference to the drawings. FIG. 1 is a diagram showing an example of a schematic configuration of a vehicle electronic key system according to the present embodiment. As shown in FIG. 1, the vehicle electronic key system includes an in-vehicle system 100 mounted on a vehicle V, a mobile device 200 carried by a user of the vehicle V, and a wireless charger 300 installed at user's home or the like. The mobile device 200 is associated with the in-vehicle system 100 and has a function as a key unique to the vehicle V.

In the present embodiment, the vehicle V is assumed to be an engine vehicle including only an engine as a power source, but is not limited to the engine vehicle. The vehicle V may be configured by a so-called hybrid vehicle including the engine and a motor as the power source, or an electric vehicle including only the motor as the power source. The vehicle V may be a vehicle having an autonomous driving function.

Each of the in-vehicle system 100 and the mobile device 200 has a system (so-called smart entry system) in which the in-vehicle system 100 authenticates the mobile device 200 and performs a predetermined vehicle control by performing a wireless communication with each other through radio waves having a predetermined frequency band. The vehicle control that can be performed by the in-vehicle system 100 includes unlocking and locking of the vehicle door, starting of an engine, and the like. The function provided by the smart entry system may be also referred to as a smart function.

The process of authenticating the mobile device 200 by the in-vehicle system 100 is a process of confirming that a communication terminal (hereinafter referred to as a communication target) that is performing a wireless communication for the in-vehicle system 100 is an authorized mobile device 200 associated with the in-vehicle system 100. The fact that the authentication is successful is comparable to determination that the communication terminal is the authorized mobile device 200.

The authentication of the mobile device 200 by the in-vehicle system 100 may be performed by a challenge response method. The following describes the details of the authentication process. In preparation for the authentication process, a common encryption key used for the authentication process is stored in each of the mobile device 200 and the in-vehicle system 100. In addition, a unique identification number (hereinafter referred to as a mobile device ID) is assigned to the mobile device 200, and the mobile device ID is registered in the in-vehicle system 100. The mobile device ID can be used as the encryption key. The in-vehicle system 100 is also assigned a unique identification number (hereinafter referred to as a vehicle ID) and the vehicle ID is registered in the mobile device 200.

Each of the in-vehicle system 100 and the mobile device 200 has a remote keyless entry (hereinafter referred to as RKE (remote keyless entry) system. The RKE system is a system in which the mobile device 200 transmits a command signal corresponding to a button operated by the user to the in-vehicle system 100, and the vehicle system 100 executes a vehicle control in accordance with the command signal transmitted from the mobile device 200. For example, the in-vehicle system 100 controls a locked state (that is, locking and unlocking) of the vehicle door based on the command signal transmitted from the mobile device 200.

Figure 2:
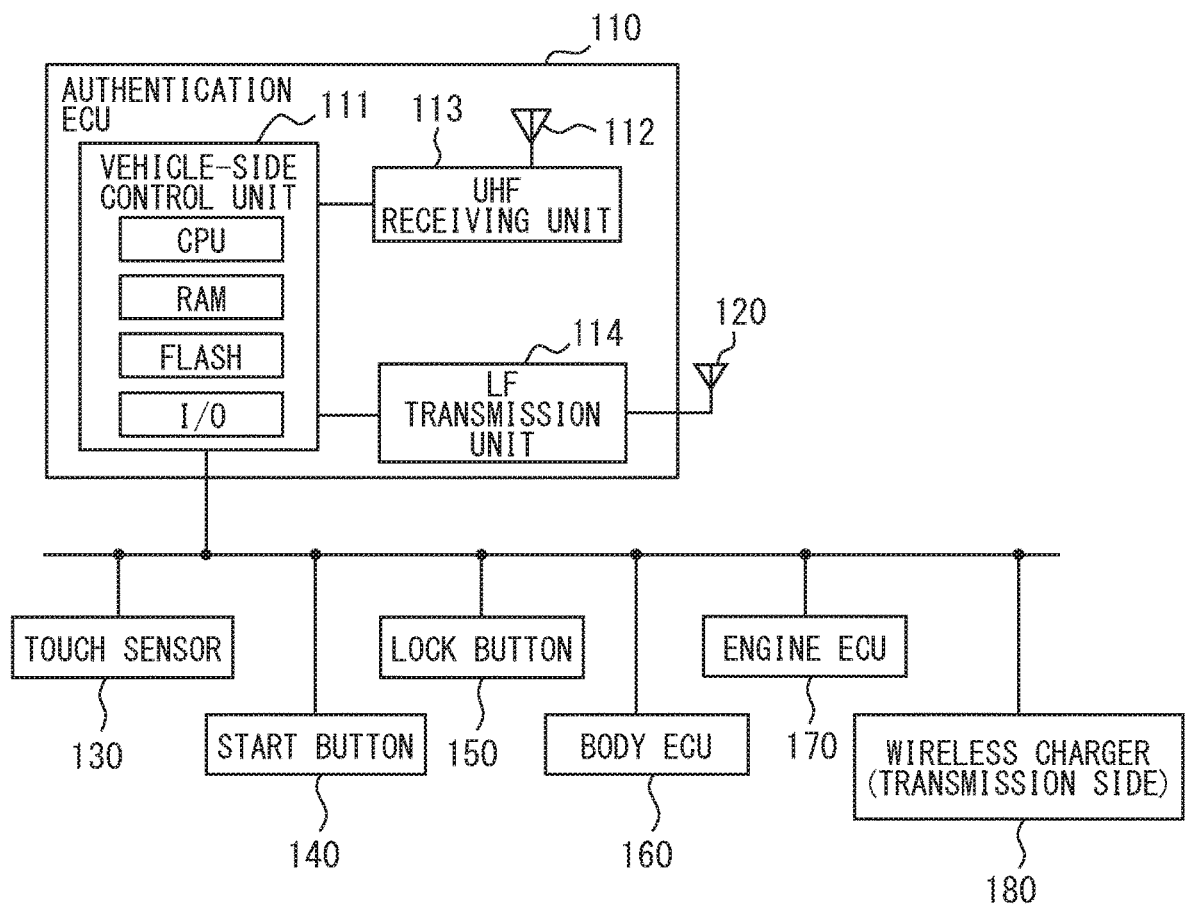
FIG. 2 is a block diagram showing a schematic configuration of an in-vehicle system including an authentication ECU.

The following describes the configuration of the in-vehicle system 100. As shown in FIG. 2, the in-vehicle system 100 includes an authentication ECU 110, an LF antenna 120, a touch sensor 130, a start button 140, a lock button 150, a body ECU 160, an engine ECU 170, and a wireless charger 180.

The authentication ECU 110 is an electronic control unit (ECU: Electronic Control Unit) that executes various processes for the smart entry system. The authentication ECU 110 corresponds to a vehicle device. The authentication ECU 110 is electrically connected to the LF antenna 120. The authentication ECU 110 is connected to the touch sensor 130, the start button 140, the lock button 150, the body ECU 160, the engine ECU 170, and the wireless charger 180 so as to be able to communicate with each other through dedicated signal lines or a communication network built in the vehicle.

The authentication ECU 110 includes a vehicle-side control unit 111 (or may referred to as a vehicle-side controller), a UHF antenna 112, a UHF receiving unit 113 (or may referred to as a UHF receiver), and an LF transmission unit 114 (or may referred to as an LF transmitter) as more detailed configuration elements. The vehicle-side control unit 111 is configured as a computer including a CPU, a RAM, a flash memory, an I/O, a bus line connecting those components, and the like. The flash memory stores a program (hereinafter referred to as a vehicle program) for causing the normal computer to function as the vehicle-side control unit 111, and the like. The authentication ECU 110 may be implemented by use of a GPU or an MPU instead of the CPU. The authentication ECU 110 may be configured by a combination of a CPU, a GPU, and an MPU.

The vehicle-side control unit 111 generates data to be transmitted to the mobile device 200, outputs the data to the LF transmission unit 114 and the UHF receiving unit 113, and acquires data received by the UHF receiving unit 113. The vehicle-side control unit 111 executes vehicle side processing for the smart entry system by causing the CPU to execute a vehicle program. The following describes the details of the vehicle-side control unit 111.

The UHF antenna 112 is an antenna for receiving a signal from the mobile device 200. For example, the UHF antenna 112 may be configured to receive a radio wave of a predetermined frequency (for example, 315 MHz or 433.9 MHz) belonging to the UHF (Ultra High Frequency) band. In other words, the UHF antenna 112 is configured to receive an RF signal in a technical field of a vehicle electronic key system. The UHF band in this example refers to 300 MHz to 3 GHz. The operation frequency of the UHF antenna 112 may be set to a frequency designed in advance as a frequency used for a wireless communication with the mobile device 200. The frequency used for the wireless communication with the mobile device 200 may be 920 MHz, 2.4 GHz, or the like. The UHF antenna 112 converts the received radio wave into an electric signal and provides the electric signal to the UHF receiving unit 113.

The UHF receiving unit 113 subjects the signal input from the UHF antenna 112 to predetermined processing such as analog-to-digital conversion, demodulation, and decoding to extract data included in the received signal. The UHF receiving unit 113 then provides the extracted data to the vehicle-side control unit 111. The UHF receiving unit 113 corresponds to a vehicle-side receiving unit.

The LF transmission unit 114 subjects the data input from the vehicle-side control unit 111 to predetermined processing such as encoding, digital modulation, and digital-to-analog conversion and converts the input data into a carrier signal. The LF transmission unit 114 then outputs the carrier signal to the LF antenna 120 and radiates the output carrier signal as the radio wave. The LF transmission unit 114 corresponds to a vehicle-side transmission unit.

The LF antenna 120 is an antenna that converts the carrier signal input from the authentication ECU 110 (more specifically, the LF transmission unit 114) into the radio wave of a predetermined frequency belonging to the LF (Low Frequency) band and radiates the radio wave into a space. In this example, the LF band refers to a frequency band of 300 kHz or less, and includes a frequency of 20 kHz to 30 kHz or the like. For example, the operation frequency of the LF antenna 120 may be set to 125 kHz. The operation frequency of the LF antenna 120 may be appropriately designed, and may be 134 kHz, for example. The operation frequency of the LF antenna 120 may be set to 30 kHz or less (for example, 28 kHz).

The multiple LF antennas 120 are disposed in a vehicle compartment and in a vehicle vicinity region of the in-vehicle system 100 as a whole so as to form a desired LF response area. The LF response area corresponds to a range in which the mobile device 200 returns a response signal to the LF band signal (hereinafter referred to as the LF signal) transmitted from the in-vehicle system 100. For example, the LF response area may be a range in which the LF signal transmitted by the in-vehicle system 100 propagates while maintaining a predetermined signal strength.

The signal strength of the LF signal defining the inner and outer boundary lines of the LF response area can be, for example, a strength that can be decoded by the mobile device 200. The signal strength of the LF signal defining the inner and outer boundary lines of the LF response area may be an area determination threshold appropriately designed by a designer among values larger than a lower limit value of a decodable signal level (that is, a decoding limit value).

In the configuration, even if the mobile device 200 receives the signal from the in-vehicle system 100 with a decodable reception strength, if the reception strength is equal to or less than the area determination threshold, the mobile device 200 determines that the LF signal is present outside the LF response area, and does not return the response.

The LF response area of the in-vehicle system 100 as a whole is a range in which the LF response areas formed by the respective LF antennas 120 are combined together (in other words, integrated). The size and shape of the LF response area formed by each LF antenna 120 may be appropriately designed. The size of the LF response area formed by each LF antenna 120 can be adjusted by a transmission power of the LF signal from the in-vehicle system 100, a reception sensitivity of the mobile device 200, and the like.

The vicinity of the vehicle is, for example, a region within a 5 m from the vehicle. It is more preferable that the vicinity of the vehicle is within 1 m from a door handle or 0.75 m or less. The LF antenna 120 is disposed, for example, in the vicinity of a door handle for a driver's seat, in the vicinity of a door handle for a front passenger seat, in the vicinity of a door handle for a trunk, in a vehicle compartment, or the like. The in-vehicle system 100 according to the present embodiment includes an LF antenna 120 for a vehicle interior and an LF antenna 120 for a vehicle exterior as the LF antenna 120. The LF antenna 120 for the vehicle interior is the LF antenna 120 having the vehicle interior (for example, the entire area of the vehicle interior) as the LF response area, and the LF antenna 120 for the vehicle exterior is the LF antenna 120 having a predetermined region (for example, in the vicinity of a door) of the vehicle exterior as the LF response area.

The touch sensor 130 is installed in each door handle of the vehicle V and detects that the user touches the door handle. The detection results of the respective touch sensors 130 are sequentially output to the authentication ECU 110. The start button 140 is a push switch for the user to start the engine. When the start button 140 is pushed by the user, the start button 140 outputs a control signal indicative of this fact to the vehicle-side control unit 111. The lock button 150 is a button for the user to lock the doors of the vehicle V. The lock button 150 may be provided on each door handle of the vehicle V. When the user presses the lock button 150, the lock button 150 outputs a control signal indicative of this fact to the authentication ECU 110. The lock button 150 may have a function as a button for accepting an unlocking instruction from the user instead of the touch sensor 130.

The body ECU 160 is an ECU that controls various actuators mounted on the vehicle. For example, the body ECU 160 outputs a drive signal for controlling the locking and unlocking of the door provided on the vehicle to a door lock motor provided on each of the vehicle doors based on an instruction from the authentication ECU 110, and locks and unlocks each of the doors. In addition, the body ECU 160 acquires information indicating an open and close state of each of the doors provided in the vehicle, information indicating a locked/unlocked state of each of the doors, and the like. Note that the open and close state of the door may be detected by a courtesy switch.

The engine ECU 170 is an ECU that controls the operation of the engine. For example, when the engine ECU 170 acquires a start instruction signal instructing starting of the engine from the authentication ECU 110, the engine ECU 170 starts the engine.

The wireless charger 180 is a device on the power transmission side for wirelessly charging the mobile device 200 by use of an electromagnetic wave of a predetermined frequency band. The wireless charger 180 corresponds to a power supply device and an in-vehicle charger. As the wireless charger 180, for example, a wireless charger conforming to a standard (so-called Qi standard) established by WPC (Wireless Power Consortium) can be adopted. As the standard of the wireless charging system to be compliant with the wireless charger 180, various standards can be employed such as AirFuel Inductive is a standard established by AirFuel (special trademark) Alliance. The AirFuel Inductive corresponds to a standard established by the PMA (Power Matters Alliance).

Figure 3:
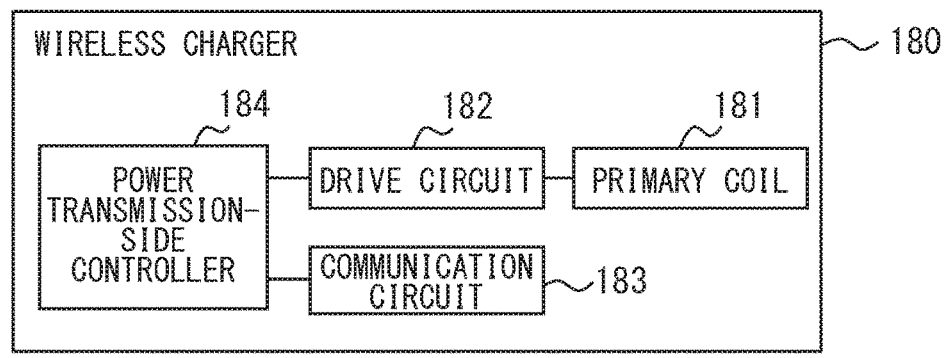
FIG. 3 is a functional block diagram of a wireless charger.

As conceptually shown in FIG. 3, the wireless charger 180 includes a primary coil 181, a drive circuit 182, a communication circuit 183, a power transmission-side controller 184, and the like. The primary coil 181 is a coil for providing an electric power as an electromagnetic wave by electromagnetic coupling with a secondary coil 2621 included in the mobile device 200. The wireless charger 180 may be configured to wirelessly charge the mobile device 200 by magnetic resonance. The drive circuit 182 is a circuit for causing an alternating current having a predetermined frequency to flow through the primary coil 181. The drive circuit 182 converts a DC current from, for example, an in-vehicle battery into an AC current of a predetermined frequency based on an instruction from the power transmission-side controller 184, and causes the AC current to flow into the primary coil 181.

For example, it is assumed that the wireless charger 180 is configured to perform wireless charging by use of an AC signal of 110 kHz. The frequency of the electromagnetic wave used for the wireless charging (hereinafter, a charge frequency fq2) may be any frequency that can be received by the LF antenna 221 included in the mobile device 200. The frequency belonging to the LF band can be adopted as the charge frequency fq2. The charge frequency fq2 may be a frequency belonging to a band of 110 kHz to 205 kHz adopted in the Qi standard. The charge frequency of the wireless charger 180 may be a frequency belonging to a band of 200 kHz to 400 kHz employed in AirFuel Inductive. The wireless charging may utilize a fixed frequency band. In this example, the charge frequency refers to a frequency located at the center of a frequency band used for wireless charging.

The communication circuit 183 is a circuit for receiving information on the charge state from the mobile device 200. The communication circuit 183 may be configured to transmit information indicating that power transmission is to be started toward the mobile device 200, and information relating to detection of a foreign matter, and device authentication. The communication circuit 183 may be configured to communicate with the mobile device 200 by use of a protocol conforming to the Qi standard, for example.

The communication circuit 183 receives a signal transmitted from the mobile device 200 and outputs the signal to the power transmission-side controller 184. The power transmission-side controller 184 recognizes that the mobile device 200 is placed at a position (hereinafter referred to as the charging area) where power can be transmitted by the primary coil 181, on the basis of the signal input from the communication circuit 183. In other words, the communication circuit 183 functions as a detector for detecting that the mobile device 200 is placed in the charging area. Whether the mobile device 200 is disposed in the charging area can be determined by various methods, such as a method using an infrared sensor or a weight sensor, in addition to communication with the mobile device 200. The state in which the mobile device 200 is present in the charging area means a state in which the primary coil 181 and the secondary coil 2621 are electromagnetically coupled (or couplable) with each other.

Various methods can be employed as a communication method with a device on the power receiving side of the mobile device 200 (a wireless charging receiver 262). For example, the wireless charger 180 may be configured to perform a wireless communication with the mobile device 200 by a near-field communication (NFC: Near Field Communication). The near-field communication in this example refers to a communication by a communication system in which a communication distance is sufficiently smaller than a short-range communication distance. The near-field communication is wireless communication conforming to a communication standard such as ISO/IEC 14443 or ISO/IEC 18092.

Figure 4:
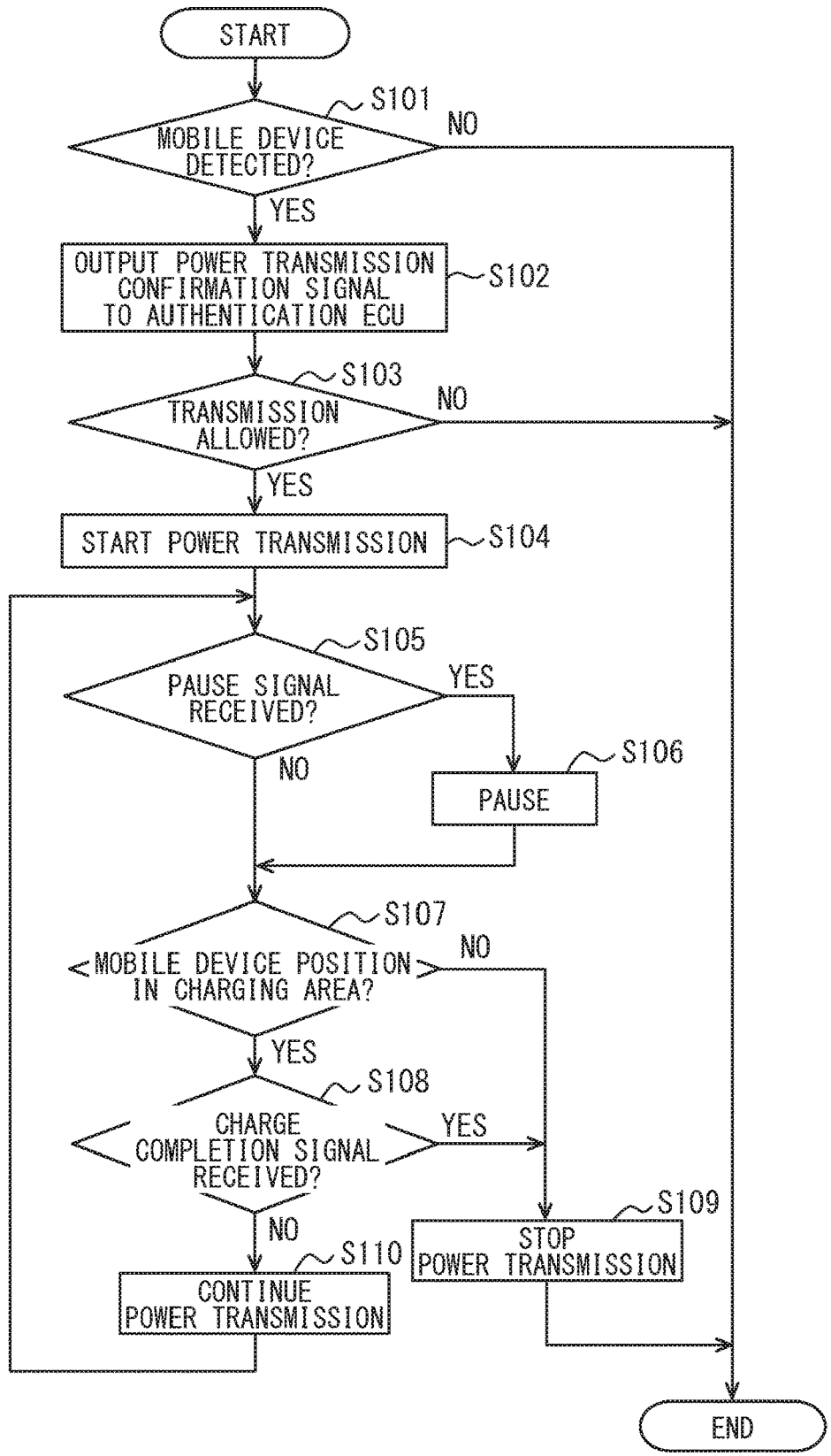
FIG. 4 is a flowchart illustrating the operation of a power transmission-side controller.

The power transmission-side controller 184 controls the operation of the drive circuit 182 based on the signals input from the authentication ECU 110 and the communication circuit 183. FIG. 4 is a flowchart showing the operation of the power transmission-side controller 184. In the flowchart shown in FIG. 4, the operation of the power transmission side controller 184 may be sequentially started sequentially (for example, every 100 milliseconds) while the mobile device 200 is determined not to be disposed in the charging area. Each block shown in FIG. 4 is mainly executed by the power transmission-side controller 184.

In S101, it is determined whether the mobile device 200 is present in the charging area based on a signal from the communication circuit 183. When the mobile device 200 is present in the charging area, an affirmative determination is made in S101, and the process proceeds to S102. When the mobile device 200 is not present in the charging area, a negative determination is made in S101, and the process ends. The determination that the mobile device 200 is present in the charging area corresponds to a detection that the mobile device 200 is disposed in the charging area.

In S102, a power transmission confirmation signal is output to the authentication ECU 110. The power transmission confirmation signal is a signal for inquiring of the authentication ECU 110 whether the power transmission to the mobile device 200 may be performed. When the authentication ECU 110 receives the power transmission confirmation signal, it is determined whether the power transmission to the mobile device 200 by the wireless charger 180 is permitted based on the condition of the vehicle or the like, and the determination result is returned to the wireless charger 180.

In S103, it is determined whether the power transmission to the mobile device 200 is permitted as a response from the authentication ECU 110 to the power transmission confirmation signal transmitted in S102. When the power transmission to the mobile device 200 is permitted, an affirmative determination is made in S103, and S104 is executed. If the power transmission to the mobile device 200 is not permitted, a negative determination is made in S103, and the flow ends.

In S104, the drive circuit 182 is operated to start the power transmission (that is, wireless charging) to the mobile device 200. In S105, it is determined whether a pause signal is input from the authentication ECU 110. The pause signal is a control signal for instructing to temporarily stop the power transmission to the mobile device 200. The authentication ECU 110 outputs the pause signal to the wireless charger 180 when a predetermined pause condition is satisfied, for example, when the LF signal is transmitted.

In the determination process of S105, if the pause signal is not input from the authentication ECU 110, S107 is executed. On the other hand, when the pause signal is input from the authentication ECU 110, an affirmative determination is made in S105, and S106 is executed. In S106, the drive circuit 182 is stopped for a predetermined period. As a result, the power transmission to the mobile device 200 is temporarily stopped. The stop time may be a time required for the authentication ECU 110 to transmit the LF signal with a predetermined margin. When the pause in S106 is completed, S107 is executed.

In S107, similarly to S101, it is determined whether the mobile device 200 is still present in the charging area. When the mobile device 200 is present in the charging area, an affirmative determination is made in S107, and the process proceeds to S108. When the mobile device 200 is not present in the charging area, a negative determination is made in S107, and S109 is executed.

In S108, it is determined whether a signal indicating that charging has been completed (a charge completion signal, which will be described later) has been received from the mobile device 200. When the charge completion signal has been received, an affirmative determination is made in S108 and S109 is executed. On the other hand, if the charge completion signal has not been received, a negative determination is made in S108, and S110 is executed. In S109, the drive circuit 182 is stopped, and the power transmission to the mobile device 200 is stopped. When the process in S109 is completed, the execution ends.

In S110, it is determined to continue the power transmission, and after a predetermined period of time has elapsed, S105 is performed. After the power transmission in S104 has been started, a series of processes from S105 to S108 are sequentially executed at predetermined intervals. While the mobile device 200 is disposed in the charging area, the mobile device 200 is wirelessly charged by the wireless charger 180.

The power transmission-side controller 184 sequentially outputs signals indicating the operation states of the wireless charger 180 to the authentication ECU 110. For example, when wirelessly transmitting the electric power of the mobile device 200, the power transmission-side controller 184 outputs a signal indicating that the electric power is being wirelessly transmitted to the mobile device 200 (hereinafter, a power transmission signal) to the authentication ECU 110. Further, the power transmission-side controller 184 detects that the mobile device 200 is placed in the charging area, and does not perform the power transmission, the power transmission-side controller 184 outputs a signal indicative of this fact (hereinafter, a stop signal) to the authentication ECU 110. Furthermore, when the power transmission-side controller 184 does not detect that the mobile device 200 is not placed in the charging area, the power transmission-side controller 184 outputs a signal indicating that the mobile device 200 is not disposed in the charging area (hereinafter, non-detection signal) to the authentication ECU 110.

The wireless charger 180 described above includes, for example, a flat portion on which the mobile device 200 is placed, and is configured such that a predetermined region of the flat portion functions as a charging area (so-called charging stand). The shape of the wireless charger 180 may be appropriately designed, for example, the wireless charger 180 may be configured as a holder for holding the mobile device 200 in a substantially upright posture. In this example, the substantially upright includes a posture tilted forward or backward by about 45 degrees.

Figure 5:
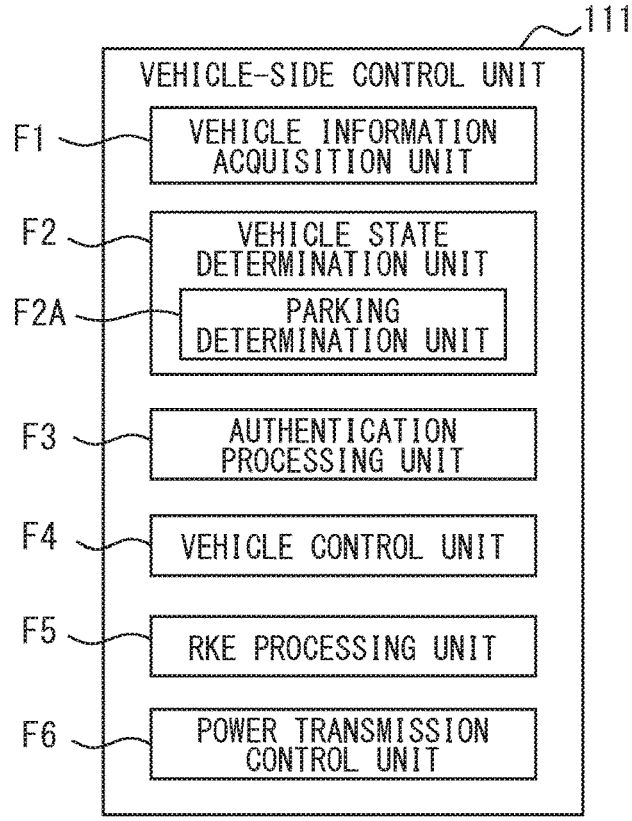
FIG. 5 is a block diagram showing a schematic configuration of a vehicle-side control unit.

As shown in FIG. 5, the vehicle-side control unit 111 includes a vehicle information acquisition unit F1 (or may referred to as a vehicle information acquisition device), a vehicle state determination unit F2 (or may referred to as a vehicle state determination device), an authentication processing unit F3 (or may referred to as an authentication processor), a vehicle control unit F4 (or may referred to as a vehicle controller), an RKE processing unit F5 (or may referred to as an RKE processor), and a power transmission control unit F6 (or may referred to as a power transmission controller) as functional blocks for causing the CPU to execute the vehicle program. Part or all of the functions of the vehicle-side control unit 111 may be hardware. A configuration in which a certain function is configured as hardware includes a configuration in which the function is realized by use of one or more ICs or the like.

The vehicle information acquisition unit F1 acquires various information (that is, vehicle information) indicating a state of the vehicle V from sensors and ECUs mounted on the vehicle such as the touch sensor 130. The vehicle information is indicative of, for example, whether the user touches the door handle, the door opening and closing state, whether the brake pedal is depressed, whether the start button 140 is pressed down, or not, whether each door is locked.

Whether the user touches the door handle, can be acquired from the touch sensor 130 and whether the start button 140 is pressed can be determined according to a signal output from the start button 140. The opening and closing states of the doors, the locking and unlocking states of the doors, and the like can be acquired from the body ECU 160, for example. The open and close state of the door may be detected by a courtesy switch. Whether the brake pedal is depressed can be detected by a brake pedal sensor that detects the amount of depression of the brake pedal by the user. The information included in the vehicle information is not limited to the above description. A shift position detected by a shift position sensor not shown, an operation state of a parking brake, and so on are also included in the vehicle information.

The vehicle state determination unit F2 determines a condition of the vehicle V based on the vehicle information acquired by the vehicle information acquisition unit F1. The vehicle state determination unit F2 includes a parking determination unit F2A as a finer functional block. The parking determination unit F2A determines whether the vehicle V is parked, or not, based on the vehicle information acquired by the vehicle information acquisition unit F1. For example, the parking determination unit F2A determines that the vehicle has been parked when all the doors are locked in a state where the engine is off and all the doors are closed. Various algorithms can be employed as a determination algorithm for determining whether the vehicle is parked.

The authentication processing unit F3 performs an authentication process by a wireless communication with the mobile device 200 in cooperation with the LF transmission unit 114 and the UHF receiving unit 113. The conditions under which the authentication processing unit F3 performs the authentication process may be appropriately designed in accordance with the content of the vehicle control performed when the authentication process is successful. The authentication processing unit F3 performs an authentication process roughly assuming two different types of situations, namely, a vehicle exterior authentication process performed assuming a state in which the mobile device 200 is present outside the vehicle, and a vehicle interior authentication process for confirming that the mobile device 200 is present in the vehicle compartment.

The vehicle exterior authentication includes, for example, an authentication for a user to get on a parked vehicle (hereinafter, boarding authentication), an authentication for locking the vehicle V (hereinafter, locking authentication), and the like. The boarding authentication corresponds to an authentication for setting the lock of the vehicle door to an unlocking/unlocking ready state. The unlocking ready state is a state in which the user can unlock the door by merely touching the touch sensor 130 of the door. The vehicle interior authentication includes, for example, authentication for starting the engine based on the push operation of the start button 140 (hereinafter, start authentication).

For example, when the vehicle V is parked, the authentication processing unit F3 cooperates with the LF transmission unit 114 to transmit an LF response request signal from the vehicle exterior LF antenna 120 to the mobile device 200 at a predetermined cycle (for example, 200 milliseconds) as a preparation process for performing the boarding authentication. The authentication processing unit F3 receives a response signal from the mobile device 200 in response to the LF response request signal, thereby recognizing (in other words, detects) that a communication terminal that may be the mobile device 200 is present in the vicinity of the vehicle. A UHF band radio wave is used for the response from the mobile device 200 to the in-vehicle system 100. In other words, the response signal returned by the mobile device 200 is a radio signal of the UHF band.

When the authentication processing unit F3 receives the response signal to the LF response request signal, the authentication processing unit F3 causes the LF transmission unit 114 to transmit a signal for authenticating the mobile device 200 (that is, an authentication signal). The authentication signal includes a challenge code. The challenge code is a code for authenticating the mobile device 200. The challenge code may be a random number generated with the use of a random number table or the like. When the mobile device 200 receives the challenge code, the mobile device 200 encrypts the challenge code with a previously registered encryption key and returns a signal (hereinafter referred to as a response signal) including the encrypted code (hereinafter referred to as a response code). In other words, the authentication signal functions as a signal requesting the mobile device 200 to return the response signal.

In addition, the authentication processing unit F3 transmits the authentication signal and generates a code (hereinafter referred to as a verification code) obtained by encrypting the challenge code with the use of the encryption key held by the authentication processing unit F4 per se. When the returned response code matches the verification code, the authentication processing unit F4 determines that a communication partner is an authorized mobile device 200 (that is, the authentication is determined to be successful).

For example, the authentication signal is transmitted when the response signal to the LF response request signal is received, but the present disclosure is not limited to the above configuration. The authentication signal may be periodically transmitted as an LF response request signal. In other words, with the inclusion of the challenge code in the LF response request signal, the LF response request signal may function as the authentication signal. The processes from the transmission of the authentication signal to the verification of the code correspond to an authentication process.

Although an example of the execution condition of the boarding authentication process and the specific flow of the authentication process has been disclosed above, the execution condition of the boarding authentication process is not limited to the above, and various conditions can be set. In addition, various specific procedures of the authentication process can be adopted. Conditions for executing the start authentication process and the locking authentication process may also be designed as appropriate.

For example, the start authentication process may be performed based on the depression of the start button 140. The lock authentication process may be performed based on the depression of the lock button 150. In other words, the authentication processing unit F3 executes the authentication process when a predetermined event occurs, such as when the start button 140 is pressed or when the lock button 150 is pressed. The occurrence of an event such as the depression of the lock button 150 by the user may be detected by the vehicle state determination unit F2.

The vehicle control unit F4 is configured to perform a vehicle control which is set in advance in accordance with the state of the vehicle V and the user operation at the time when the authentication process by the authentication processing unit F3 is successful, based on the success of the authentication process. For example, the vehicle control unit F4 sets the door lock mechanism of the vehicle V to the unlocking ready state when the authentication process in the state in which the door of the vehicle V is locked (that is, the boarding authentication process) succeeds. The unlocking ready state is a state in which the user can unlock the door by merely touching the touch sensor 130 of the door. When a signal indicating that the user touches the touch sensor 130 is input from the touch sensor 130, the authentication processing unit F4 unlocks the key of the door in cooperation with the body ECU 160.

The vehicle control unit F4 starts the engine in conjunction with the engine ECU 170 when the start authentication is successful while the engine is stopped. When the operation mode of the authentication ECU 110 is the normal mode and the locking authentication is successful, all the doors of the vehicle V are locked in cooperation with the body ECU 160. In addition, the content of the vehicle control performed by the vehicle control unit F4 is appropriately designed in accordance with a scene when the authentication process succeeds (in other words, the state of the vehicle V). In other words, the conditions under which the authentication processing unit F3 executes the authentication process are designed in accordance with the content of the vehicle control executed by the vehicle control unit F4.

The RKE processing unit F5 implements processing on the vehicle-side for the RKE system. For example, the RKE processing unit F5 analyzes the contents of the command signal transmitted from the mobile device 200, and executes a vehicle control corresponding to the command signal in cooperation with the body ECU 160 or the like. The vehicle control corresponding to the command signal includes, for example, door locking and unlocking, opening and closing of side windows, illumination lighting, startup of an air conditioning system mounted on the vehicle, and the like.

The power transmission control unit F6 is configured to control the operation of the wireless charger 180 based on the signal input from the wireless charger 180, the state of the vehicle V, and the operation state of the authentication processing unit F3. When receiving the power transmission confirmation signal from the wireless charger 180, the power transmission control unit F6 determines whether or not the charging of the mobile device 200 by the wireless charger 180 is allowed, based on the vehicle state determined by the vehicle state determination unit F2.

For example, when the engine of the vehicle is being stopped and the battery level of the in-vehicle battery is equal to or less than a predetermined residual threshold, the charging of the mobile device 200 by the wireless charger 180 is not permitted in order to prevent the battery from being exhausting. The condition that the charging of the mobile device 200 by the wireless charger 180 is not permitted (hereinafter, a power transmission prohibition condition) may be designed as appropriate. The power transmission prohibition condition corresponds to a condition for prohibiting charging of the mobile device 200 by the wireless charger 180.

When the current state of the vehicle does not satisfy the power transmission prohibition condition, the power transmission control unit F6 transmits a signal indicating that the power transmission to the mobile device 200 is permitted to the wireless charger 180. When the power transmission prohibition condition is satisfied, the power transmission control unit F6 transmits a signal indicating prohibition of the power transmission to the mobile device 200 to the wireless charger 180.

It may be assumed that the wireless charger 180 does not transmit an electric power in a software manner by outputting to the wireless charger 180 a signal indicating that the power transmission is prohibited, but the present disclosure is not limited to the above configuration. The wireless charger 180 may not be operated by controlling a connection state of a switch (so-called relay switch) for turning on/off a power feeding from the in-vehicle power supply system to the wireless charger 180.

When receiving the power transmission confirmation signal from the in-vehicle wireless charger 180, the power transmission control unit F6 transmits the LF signal (hereinafter, a vehicle charge notification signal) notifying that the charging by the in-vehicle wireless charger 180 starts to the mobile device 200 in cooperation with the LF transmission unit 114. When the mobile device 200 receives the vehicle charge notification signal, the mobile device 200 can recognize that the power transmission source of the wireless power is not the wireless charger 300 disposed at home or the like but the in-vehicle wireless charger 180 in the vehicle.

It may be assumed that the power transmission control unit F6 transmits the vehicle charge notification signal before the wireless charger 180 starts the power transmission. For example, the vehicle charge notification signal is transmitted during a period from when the power transmission confirmation signal is received from the wireless charger 180 to when the signal indicating that the power transmission to the mobile device 200 is permitted is transmitted to the wireless charger 180.

When receiving the power transmission signal from the wireless charger 180, the power transmission control unit F6 determines that the wireless charger 180 is wirelessly charging the mobile device 200. When receiving a stop signal from the wireless charger 180, the power transmission control unit F6 determines that the mobile device 200 is present in the charging area, and the wireless charging is being stopped. When receiving a non-detection signal from the wireless charger 180, the power transmission control unit F6 determines that the mobile device 200 is not present in the charging area.

The power transmission control unit F6 outputs a pause signal to the wireless charger 180 when the LF transmission unit 114 transmits an LF signal to the mobile device 200 for position detection, authentication, and the like of the mobile device 200 in a situation where the wireless charger 180 is transmitting the electric power. Since the wireless charger 180 stops the power transmission once, the possibility that the reception of the LF signal in the mobile device 200 fails due to the electromagnetic wave emitted by the wireless charger 180 is reduced. A state in which the wireless charger 180 stops the power transmission by the pause signal corresponds to an example of a state in which power transmission is not performed even though the mobile device 200 is placed in the charging area. As a case where the power transmission is not performed even though the mobile device 200 is placed in the charging area, there is another case in which a built-in battery 261 of the mobile device 200 is in a fully charged state.

The pause signal is output to the wireless charger 180 so that a wireless communication between the authentication ECU 110 and the mobile device 200 is performed even when the mobile device 200 is being wirelessly charged by the wireless charger 180 disposed in the vehicle interior. However, the present disclosure is not limited to the above configuration. The pause signal may be configured not to be output.

Like the wireless charger 180, the wireless charger 300 is also a device for wireless charging of the mobile device 200. The wireless charger 300 also corresponds to a power supply device. The specific configuration of the wireless charger 300 is substantially the same as that of the wireless charger 180. However, the wireless charger 300 is different from the wireless charger 180 in that the wireless charger 300 does not cooperate with the authentication ECU 110. The wireless charger 300 does not have a configuration for transmitting and receiving signals (for example, a pause signal and a power transmission confirmation signal) to and from the authentication ECU 110. The wireless charger 300 is configured to operate the drive circuit to start the power transmission when detecting that the mobile device 200 is placed in the charging area.

In the following situations, when the wireless charger 180 is not distinguished from the wireless charger 300, the reference numeral is omitted and described as a wireless charger. The wireless charger 180 is a wireless charger associated with the vehicle V. The in-vehicle wireless charger 180 is also referred to as an in-vehicle wireless charger. The wireless charger 300 is a wireless charger 300 disposed at home or the like (in other words, not cooperating with the vehicle V). The wireless charger 300 is also referred to as a non-cooperative wireless charger. The non-cooperative wireless charger 300 may be provided in a gasoline station, a vehicle dealer, a restaurant such as a cafe, a mobile phone shop, or the like.

Figure 6:
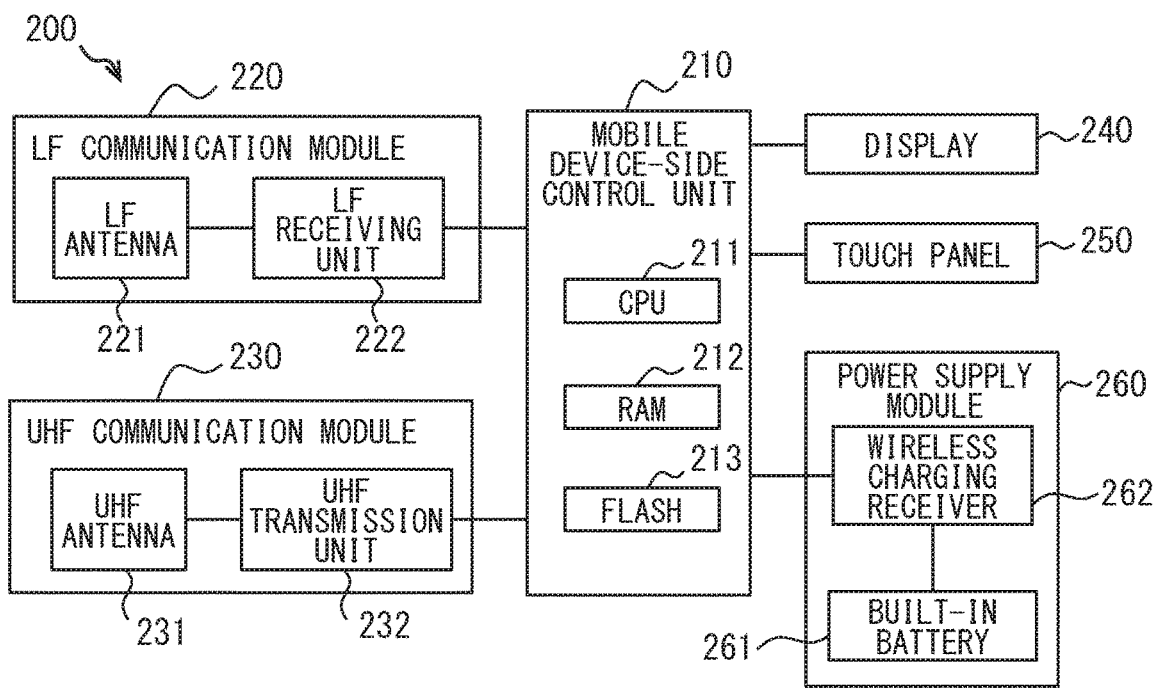
FIG. 6 is a block diagram showing a schematic configuration of a mobile device.

The following describes the configuration of the mobile device 200. As shown in FIG. 6, the mobile device 200 includes a mobile device-side control unit 210, an LF communication module 220, a UHF communication module 230, a display 240, a touch panel 250, and a power supply module 260. The mobile device-side control unit 210, the display 240, the touch panel 250, and the power supply module 260 are connected to each other so as to be able to communicate with each other. The power supply module 260 is electrically connected to each unit so as to supply an electric power to each unit.

The mobile device-side control unit 210 is configured to control the entire operation of the mobile device 200, and is configured by, for example, a computer. In other words, the mobile device-side control unit 210 adopts a CPU 211, a RAM 212, a flash memory 213, an I/O (not shown), a clock oscillator, and the like. The flash memory stores a program (hereinafter, mobile device programs) for causing a computer to function as the mobile device-side control unit 210.

The mobile device-side control unit 210 implements a smart entry system or the like by causing the CPU 211 to execute mobile device programs stored in the flash memory 213. The flash memory 213 stores an encryption key and the like used for generating a response code from a challenge code, in addition to the programs described above. The mobile device-side control unit 210 may be implemented by use of a GPU, an MPU, and an IC instead of the CPU 211. The mobile device side control unit 210 may be configured by a combination of the CPU, the GPU, the MPU, and the IC together. The following describes detailed functions of the mobile device-side control unit 210.

The LF communication module 220 is configured to receive an LF signal transmitted from the in-vehicle system 100. The LF communication module 220 adopts an LF antenna 221 and an LF receiving unit 222 (or may referred to as an LF receiver). The LF antenna 221 is an antenna for receiving radio waves in the LF band. For example, the LF antenna 221 is configured to receive the radio waves from 100 kHz to 200 kHz. The LF antenna 221 is connected to the LF receiving unit 222, converts the received radio wave into an electric signal, and outputs the electric signal to the LF receiving unit 222. The LF antenna 221 corresponds to a reception antenna.

The operating band of the LF antennas 221 may include the frequency of the radio waves transmitted as LF signals by the in-vehicle system 100 (hereinafter, a vehicle transmission frequency fq1) and the charge frequency fq2. In this example, the vehicle transmission frequency fq1 is 125 kHz, and the vehicle charge frequency fq2 is set to 110 kHz. Therefore, it is sufficient that the LF antenna 221 is configured to receive the radio waves from 110 kHz to 125 kHz.

The LF receiving unit 222 is configured to extract data included in a signal received by the LF antenna 221 and provide the extracted data to the mobile device-side control unit 210. The LF receiving unit 222 performs a predetermined reception process such as analog-to-digital conversion, demodulation, and decoding on the electric signal input from the LF antenna 221. The LF receiving unit 222 may be implemented by adopting, for example, an integrated circuit (that is, IC) that performs some or all of the processing described above.

Figure 7:
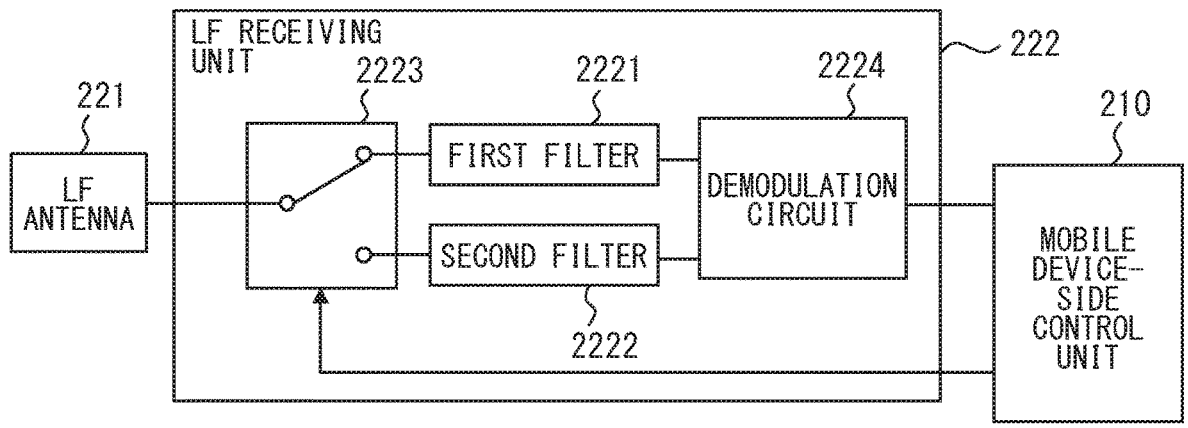
FIG. 7 is a block diagram showing a schematic configuration of an LF receiving unit.
Figure 8:
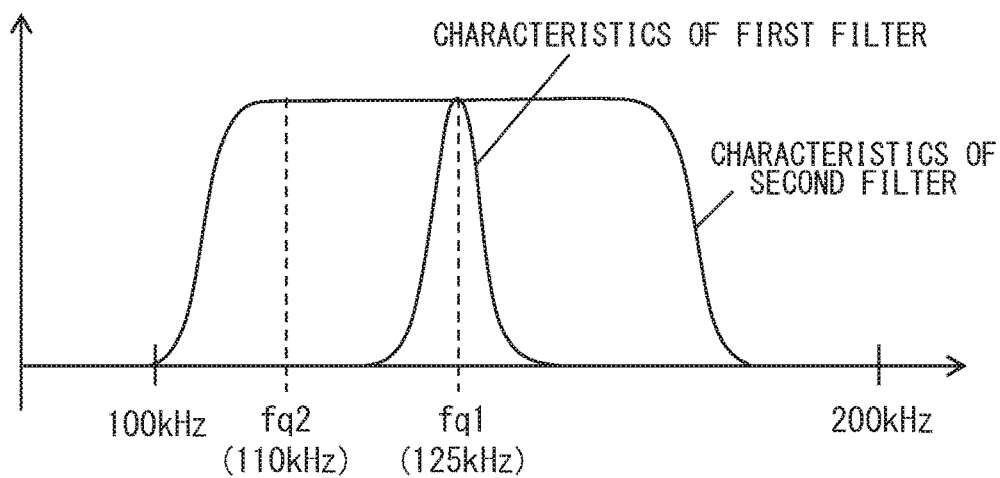
FIG. 8 is a conceptual diagram illustrating a first filter characteristic and a second filter characteristic.

As shown in FIG. 7, the LF receiving unit 222 includes a first filter 2221, a second filter 2222, a filter switch 2223, and a demodulation processing unit 2224. Each of the first filter 2221 and the second filter 2222 is a bandpass filter circuit for passing a signal in a predetermined frequency band. As shown in FIG. 8, the first filter 2221 is a bandpass filter formed so as to pass a signal of the vehicle transmission frequency fq1 while not passing a signal of the vehicle charge frequency fq2.

The first filter 2221 may be configured to block signals other than the vehicle transmission frequency as much as possible. The blocking in this example includes a mode of reducing a signal level and a mode of inhibiting the passing amount. For example, the first filter 2221 is configured as a filter having the vehicle transmission frequency fq1 as a center frequency and a pass bandwidth of several kHz.

The second filter 2222 is a bandpass filter formed so as to pass both the signal of the vehicle transmission frequency fq1 and the signal of the charge frequency fq2. The pass bandwidth of the second filter 2222 may be wider in the frequency range in which the LF antenna 221 can receive. For example, the pass bandwidth of the second filter 2222 is set from 105 kHz to 150 kHz. The filter characteristic of the first filter 2221 may be also referred to as a first filter characteristic or a first filter frequency response, and the filter characteristic of the second filter 2222 may also be referred to as a second filter characteristic or a second filter frequency response. The filter characteristic in this example refers to a pass bandwidth.

An input-side terminal of the first filter 2221 is electrically connected to the filter switch 2223, and an output-side terminal of the first filter 2221 is electrically connected to the demodulation processing unit 2224. An input-side terminal of the second filter 2222 is electrically connected to the filter switch 2223, and an output-side terminal of the second filter 2222 is electrically connected to the demodulation processing unit 2224. The first filter 2221 and the second filter 2222 are connected to the LF antenna 221 through the filter switch 2223.

The filter switch 2223 is a switch for switching a filter connected to the LF antenna 221. The filter switch 2223 switches a transmission path of a signal received by the LF antenna 221 to the demodulation processing unit 2224. Since the first filter 2221 and the second filter 2222 have different filter characteristics from each other, the filter switch 2223 corresponds to a configuration for changing the filter characteristics of the LF communication module, according to another aspect.

In the filter switch 2223, only one of the first filter 2221 and the second filter 2222 is connected to the LF antenna 221. In other words, the filter switch 2223 has, as a connection state, a first connection state in which the LF antenna 221 and the first filter 2221 are electrically connected to each other, and a second connection state in which the LF antenna 221 and the second filter 2222 are electrically connected to each other.

The first connection state corresponds to a connection state in which a signal received by the LF antenna 221 is output to the demodulation processing unit 2224 through the first filter 2221. In the first connection state, only a signal component corresponding to the filter characteristic included in the first filter 2221 among the signals received by the LF antenna 221 is transmitted to the demodulation processing unit 2224. The second connection state corresponds to a connection state in which a signal received by the LF antenna 221 is output to the demodulation processing unit 2224 through the second filter 2222. The connection state of the filter switch 2223 is controlled by the mobile device-side control unit 210.

The first filter 2221, the second filter 2222, and the filter switch 2223 may be configured as a digital filter whose filter characteristics can be dynamically changed by changing the filter coefficients. In other words, the first filter 2221, the second filter 2222, and the filter switch 2223 may be implemented as software. The first filter 2221, the second filter 2222, and the filter switch 2223 may also be realized by use of one or more ICs. A set of the first filter 2221, the second filter 2222, and the filter switch 2223 corresponds to a filter unit. The filter unit may be configured to be operable by switching between the first filter characteristic and the second filter characteristic.

The demodulation processing unit 2224 is configured to demodulate signals input from the first filter 2221 and the second filter 2222. When the connection state of the filter switch 2223 is set to the first connection state, the signal input from the first filter 2221 is demodulated. When the connection state of the filter switch 2223 is set to the second connection state, the signal input from the second filter 2222 is demodulated. The demodulation processing unit 2224 can be realized by various circuit configurations. The demodulation processing unit 2224 may adopt software or an IC. The demodulation processing unit 2224 may also be configured to perform a decoding process.

The UHF communication module 230 is configured to allow the mobile device 200 to transmit a signal in the UHF band to the in-vehicle system 100. The UHF communication module 230 may adopt the UHF antenna 231 and the UHF transmission unit 232 (or may referred to as the UHF transmitter). The UHF antenna 231 is an antenna for transmitting radio waves in the UHF band (315 MHz in this case). The UHF antenna 231 is electrically connected to the UHF transmitter 232, and converts an electric signal input from the UHF transmission unit 232 into a radio wave to radiate the radio wave.

The UHF transmission unit 232 converts the baseband signal into a carrier signal by performing predetermined processing such as encoding, modulation, digital-to-analog conversion, and the like on the baseband signal input from the mobile device-side control unit 210. The generated carrier signal is output to the UHF antenna 231 and radiated as a radio wave in the UHF band. The UHF transmission unit 232 adopts, for example, an integrated circuit (that is, an IC) that performs part or all of the above processing.

The UHF transmission unit 232 is configured such that a transmission signal from the UHF antenna 231 propagates at least 10 m or more. In this example, a propagation distance of the transmission signal is a distance at which another communication device (for example, the in-vehicle system 100), propagates in a state where the signal strength that can be decoded is maintained. As an example, the transmission power and the like of the UHF transmission unit 232 are set so that the propagation distance of the transmission signal within the line-of-sight is about 25 m. The UHF transmission unit 232 corresponds to a mobile device-side transmission unit.

The display 240 is a device for displaying a video signal (in other words, image data), input from the mobile device-side control unit 210. As the display 240, various display devices such as a liquid crystal display and an organic EL display can be adopted.

The touch panel 250 is an input device for a user to operate the mobile device 200, and is disposed so as to overlap with the display 240. The touch panel 250 detects a position touched by the user, and sequentially outputs a touch position signal indicating the position to the mobile device-side control unit 210 as an operation signal. The mobile device 200 may be provided with a mechanical button or the like as an input device.

The power supply module 260 is configured to supply an operation power to each unit of the mobile device 200. The power supply module 260 includes a built-in battery 261 and a wireless charging receiver 262. The built-in battery 261 is a battery that stores an electric power used for the operation of the mobile device 200, and adopts a battery that can be charged and discharged (that is, a secondary battery). For example, the built-in battery 261 adopts a lithium ion secondary battery. As the built-in battery 261, various secondary batteries such as a lithium ion polymer secondary battery, a nickel-cadmium battery, a nickel-metal hydride rechargeable battery, and the like can be employed.

Figure 9:
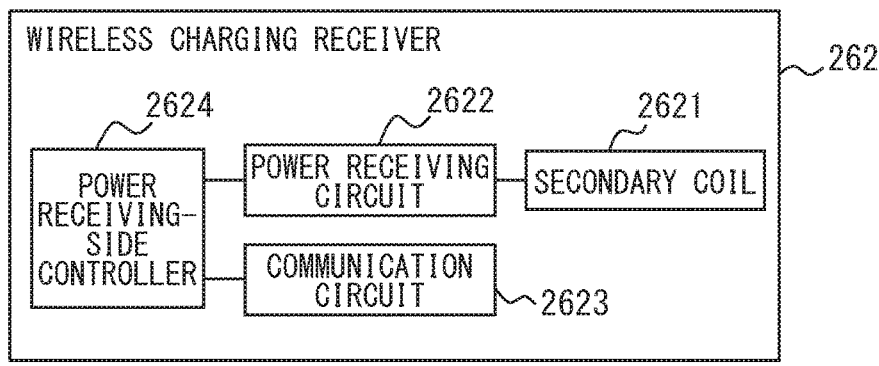
FIG. 9 is a block diagram showing a schematic configuration of a wireless charging receiver.

The wireless charging receiver 262 is configured to receive an electric power transmitted from the wireless charger and charge the built-in battery 261. The wireless charging receiver 262 corresponds to a charging unit or a charger, in particular, a wireless charging unit or a wireless charger. As shown in FIG. 9, the wireless charging receiver 262 includes a secondary coil 2621, a power receiving circuit 2622, a communication circuit 2623, and a power receiving-side controller 2624. The secondary coil 2621 is a coil for receiving an electric power wirelessly transmitted from the wireless charger by electromagnetic coupling with a primary coil of the wireless charger.

The power receiving circuit 2622 is a configuration for converting the electric power received by the secondary coil 2621 to a DC voltage appropriate for charging the built-in battery 261, and is realized by use of a rectifier circuit or the like. The power receiving circuit 2622 outputs a signal indicating the voltage received by the secondary coil 2621 to the power receiving-side controller 2624.

The communication circuit 2623 is a circuit for transmitting information on the charge state of the built-in battery 261 to the wireless charger. The communication circuit 2623 modulates data input from the power receiving-side controller 2624 and transmits the modulated data. The communication circuit 2623 may be configured to communicate with the communication circuit 183 included in the wireless charger. For example, the communication circuit 2623 may be configured to communicate with the wireless charging device by adopting a protocol conforming to the Qi standard.

The power receiving-side controller 2624 is configured to control the overall operation of the wireless charging receiver 262 based on a power level of the built-in battery 261, a power receiving state of the power receiving circuit 2622, and the like. For example, the power receiving-side controller 2624 determines whether the mobile device 200 is disposed in the charging area based on a state of communication with the wireless charger in the communication circuit 2623 and a state of power reception in the power receiving circuit 2622.

The power receiving-side controller 2624 performs a control to store an electric power supplied from the wireless charger in the built-in battery 261 in conjunction with the power receiving circuit 2622 when the mobile device 200 is located in the charging area and the built-in battery 261 is not fully charged (that is, in a chargeable state). When the control of charging the built-in battery 261 is being executed, the power receiving-side controller 2624 outputs a signal indicating that the built-in battery 261 is being charged (hereinafter, a power receiving signal) to the mobile device-side control unit 210.

In addition, when the built-in battery 261 is fully charged by the wireless charging, the power receiving-side controller 2624 cooperates with the communication circuit 2623 to transmit a charge completion signal indicating that the charging is completed to the wireless charger. The charge completion signal acts as a signal requesting to terminate the power transmission. The power receiving-side controller 2624 may be configured to transmit a signal indicating that charging is enabled to the wireless charger to the wireless charger in cooperation with the communication circuit 2623 when charging of the built-in battery 261 is started.

Figure 10:
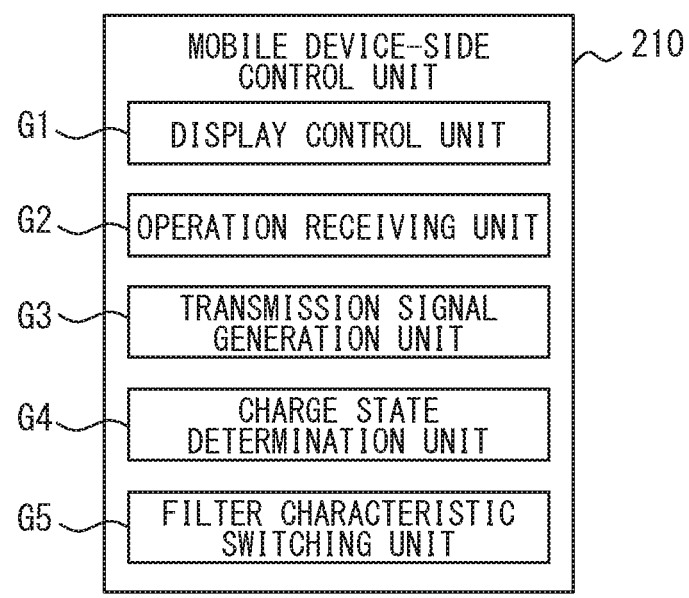
FIG. 10 is a functional block diagram of a mobile device-side control unit.

As shown in FIG. 10, the mobile device-side control unit 210 includes a display control unit G1 (or may referred to as a display controller), an operation receiving unit G2 (or may referred to as an operation receiver), a transmission signal generation unit G3 (or may referred to as a transmission signal generator G3), a charge state determination unit G4 (or may referred to as a charge state determiner), and a filter characteristic switching unit G5 (or may referred to as a filter characteristic switching device) as functional blocks realized by executing the mobile device program described above. Part or all of the functional blocks included in the mobile device-side control unit 210 may be implemented as hardware adopting one or more ICs or the like.

The display control unit G1 is configured to control on/off of the display 240 and a screen to be displayed on the display 240 based on a user operation through the touch panel 250, a signal input from the LF communication module 220, and the like. The various screens displayed by the display control unit G1 include images (hereinafter referred to as buttons) corresponding to multiple options that can be selected by the user. The user can cause the mobile device 200 to execute various functions by selecting those buttons (here, touch operation).

Figure 11:
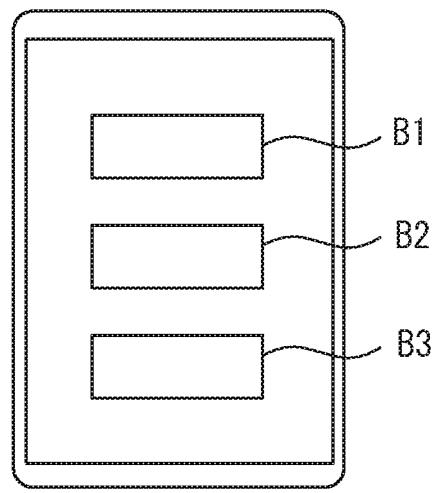
FIG. 11 is a diagram illustrating the operation of a display control unit.

For example, as shown in FIG. 11, the display control unit G1 displays a screen in which multiple operation buttons (hereinafter referred to as command buttons) for the user to instruct an execution of vehicle control are arranged. The command buttons include, for example, an unlocking instruction button B1 which is a command button for unlocking all the doors, a locking instruction button B2 which is a command button for locking all the doors, and a trunk unlocking instruction button B3 which is a command button for instructing unlocking of a trunk door.

When the vehicle V is equipped with an automatic parking function, the display control unit G1 can also display a command button for using the automatic parking function. The automatic parking function in this example refers to a function of automatically parking the vehicle V. The automatic parking also includes a mode in which an autonomous driving of the vehicle V is continued by the user continuing to touch a command button for instructing the autonomous driving to be continued.

The operation receiving unit G2 specifies a button selected by the user from the touch position of the user detected by the touch panel 250 and the positions of various buttons displayed on the display 240. When specifying the button selected by the user, the operation receiving unit G2 executes processing associated with the button. For example, when detecting that a predetermined command button has been touched by the user, the operation receiving unit G2 requests the transmission signal generation unit G3 to transmit a command signal corresponding to the command button.

The transmission signal generation unit G3 generates a signal to be transmitted to the in-vehicle system 100, and outputs the signal to the UHF communication module 230. For example, when the LF communication module 220 receives the LF response request signal from the in-vehicle system 100, the transmission signal generation unit G3 generates a predetermined signal to be transmitted as a response to the received signal. When the LF communication module 220 receives a challenge signal, the transmission signal generation unit G3 generates a response signal including a response code generated by use of the mobile device ID. The transmission signal generation unit corresponds to a response signal generation unit or a response signal generator.

When the command button is pressed by the user, the transmission signal generation unit G3 generates a command signal instructing to execute a vehicle control corresponding to the command button. For example, when the unlocking instruction button B1 is pressed, a command signal (hereinafter referred to as an unlock command signal) for instructing to unlock all the doors is generated. When the locking instruction button B2 is pressed, a command signal for instructing to lock all the doors is generated.

The various signals generated by the transmission signal generation unit G3 are output to the UHF communication module 230 and transmitted as radio signals in the UHF band. The type of the signal generated by the transmission signal generation unit G3 is not limited to the signal described above.

The charge state determination unit G4 determines whether the wireless charging receiver 262 is performing wireless charging based on a signal input from the wireless charging receiver 262 (for example, a power receiving signal). Further, when the wireless charging receiver 262 is performing wireless charging, the charge state determination unit G4 determines whether or not the power transmission source of the electric power received by the power the wireless charging receiver 262 is the in-vehicle wireless charger 180 based on whether or not to receive the vehicle charge notification signal from the in-vehicle system 100.

The situation that the vehicle charge notification signal is received means that the power transmission source of the wireless power received by the wireless charging receiver 262 is the in-vehicle wireless charger 180. When receiving the vehicle charge notification signal, the charge state determination unit G4 determines that the power transmission source of the wireless power is the in-vehicle wireless charger 180. When the vehicle charge notification signal is not received, the wireless power transmission source is the non-cooperative wireless charger 300 disposed at home. When the vehicle charge notification signal is not received, the charge state determination unit G4 determines that the wireless power transmission source is the non-cooperative wireless charger 300.

The filter characteristic switching unit G5 is configured to control a connection state of the filter switch 2223 based on the determination result of the charge state determination unit G4, that is, an execution state of the wireless charging. The filter characteristic switching unit G5 according to the present embodiment controls the connection state of the filter switch 2223 according to whether the wireless charging receiver 262 is performing wireless charging, and whether the power transmission source of the power is the in-vehicle wireless charger 180 when the wireless charging receiver 262 is performing wireless charging. Switching the connection state of the filter switch 2223 corresponds to changing the filter characteristic of the LF receiving unit 222. In other words, the filter characteristic switching unit G5 corresponds to a configuration for changing the filter characteristic of the LF receiving unit 222.

Figure 12:
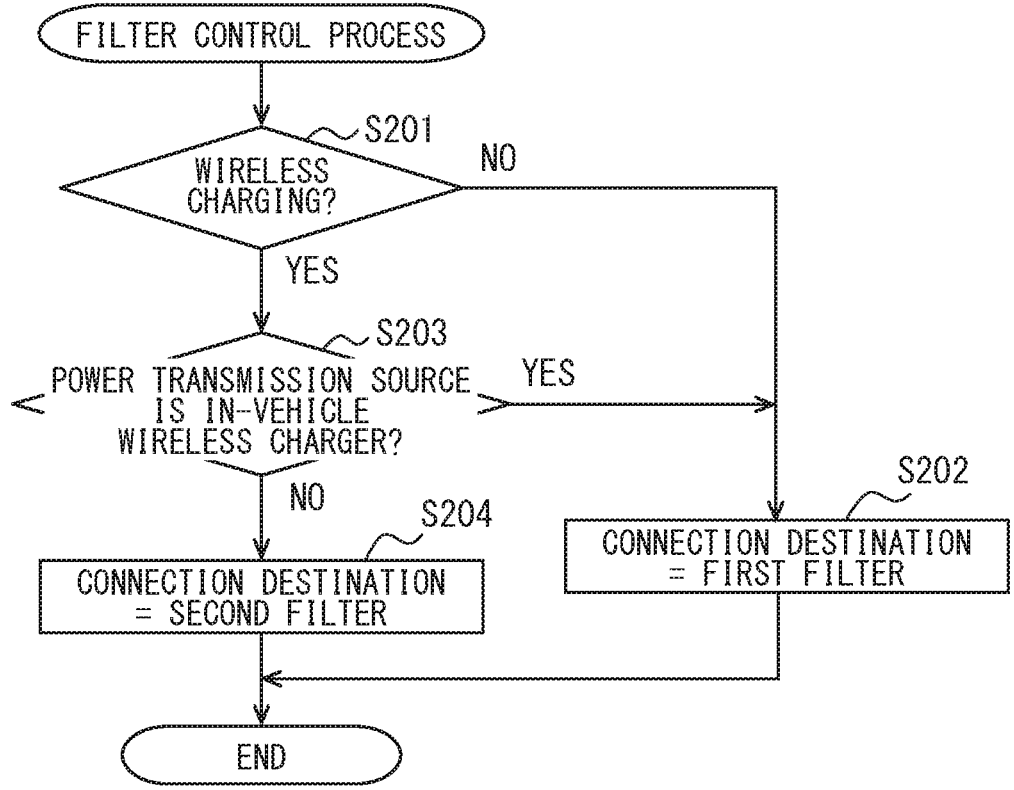
FIG. 12 is a flowchart of a filter control process.

FIG. 12 is a flowchart illustrating the operation of the filter characteristic switching unit G5. Subsequently, the processing for switching filter characteristics is called a filter control process. The filter characteristic control process may be performed sequentially (for example, every 200 milliseconds).

In S201, the charge state determination unit G4 determines whether the built-in battery 261 is being wirelessly charged based on signals input from the wireless charging receiver 262. When the receiving signal is input from the wireless charging receiver 262 (specifically, the power receiving-side controller 2624), the charge state determination unit G4 determines that the wireless charging is being performed. When the power receiving signal is not input from the wireless charging receiver 262, the charge state determination unit G4 determines that the wireless charging is not being performed. If it is determined in S201 that the built-in battery 261 is not being wirelessly charged, S202 is executed. If it is determined in S201 that wireless charging is being performed, S203 is executed.

In S202, the filter characteristic switching unit G5 sets the connection state of the filter switch 2223 to the first connection state, so that the signal received by the LF antenna 221 is transmitted to the demodulation processing unit 2224 through the first filter 2221. Only the signals of the frequency components in the vicinity of the vehicle transmission frequency fq1 are input to the demodulation processing unit 2224. If the connection state of the filter switch 2223 has already been set to the first connection state at the time of executing S202, the state may be maintained.

In S203, the charge state determination unit G4 determines whether the power transmission source of the wireless power is the in-vehicle wireless charger 180 based on whether the vehicle charge notification signal is received from the in-vehicle system 100 when the wireless charging is started. If the vehicle charge notification signal has been received, the charge state determination unit G4 determines that the wireless power transmission source is the in-vehicle wireless charger 180, and executes S202. In other words, the connection state of the filter switch 2223 is set to the first connection state.

When the power transmission source of the wireless power is the in-vehicle wireless charger 180, the filter characteristic of the LF receiving unit 222 is set to the first filter characteristic. Therefore, it is possible to reduce the possibility that the electromagnetic wave emitted from the in-vehicle wireless charger 180 becomes noisy and the wireless communication between the authentication ECU 110 and the mobile device 200 fails. When the vehicle charge notification signal has not been received, the charge state determination unit G4 determines that the wireless power transmission source is not the in-vehicle wireless charger 180, and executes S204.

In S204, the connection state of the filter switch 2223 is set to the second connection state, so that the signal received by the LF antenna 221 is transmitted to the demodulation processing unit 2224 through the second filter 2222.

With the execution of S204, the electromagnetic wave components emitted from the wireless charger are also input to the demodulation processing unit 2224. The electromagnetic wave component emitted by the wireless charger is a noise for the smart entry system. Therefore, in a state in which the filter characteristic of the LF receiving unit 222 is set to the second filter characteristic, the reception of the LF signal fails due to the electromagnetic wave component emitted by the wireless charger. Naturally, if the reception of the LF signal fails, the mobile device 200 does not return the response signal. Therefore, the mobile device 200 does not return a response to the LF signal from the in-vehicle system 100 while being wirelessly charged by the non-cooperative wireless charger 300 disposed at home. If the connection state of the filter switch 2223 has already been set to the second connection state at the time of executing S204, the state may be maintained.

In the vehicle electronic key system, a third party relays the LF signal transmitted from the vehicle V by use of the repeater, and therefore indirectly establish the mutual communication between the mobile device 200 and the in-vehicle system 100, and there is a possibility of a relay attack that illegally establishes the authentication of the mobile device 200 by the authentication ECU 110. As a situation in which the user receives such a relay attack, for example, there is a situation in which the user stays at home and the vehicle is parked in a parking lot in the vicinity of the home.

According to the configuration of the present embodiment, the filter characteristic of the LF receiving unit 222 in the mobile device 200 is set to the second filter characteristic while the mobile device 200 is being wirelessly charged by the wireless charger 300 disposed at home. The electromagnetic wave emitted from the wireless charger 300 acts to disturb the LF signal, and the mobile device 200 is less likely to return the response signal corresponding to the LF signal.

When the mobile device 200 is being charged by the wireless charger 300 disposed in the home, the mobile device 200 is also present in the home, and the user does not use the vehicle V. When the mobile device 200 is originally brought into the home, the LF signal from the in-vehicle system 100 is not originally received. Therefore, the user's convenience is not deteriorated even if the operation is performed as described above.

In addition, there is a high possibility that the LF signal from the in-vehicle system 100 is relayed by the repeater when the LF signal from the in-vehicle system 100 comes to the mobile device 200 brought into the home. According to the present embodiment, while the mobile device 200 is being wirelessly charged by the wireless charger 300 disposed at home, the LF signal is disturbed by the electromagnetic wave emitted from the wireless charger 300, and the mobile device 200 is less likely to return the response signal. Unless the mobile device 200 returns a response signal, the authentication ECU 110 does not execute a vehicle control such as unlocking of vehicle doors, and therefore, the third party cannot illegally use the vehicle V. Therefore, the possibility can be reduced that the vehicle V is used illegally by a third party in a situation where the mobile device 200 is brought into the home.

In the above description, the mobile device 200 sets the filter characteristic of the LF receiving unit 222 to the second filter characteristic when the power transmission source is the non-cooperative wireless charger 300 after identifying whether the power source of the wireless power is the in-vehicle wireless charger 180 or the non-cooperative wireless charger 300, but the present disclosure is not limited to the above configuration. The filter characteristic of the LF receiving unit 222 may be set to the second filter characteristic during wireless charging without identifying whether the wireless power transmission source is the in-vehicle wireless charger 180 or the non-cooperative wireless charger 300.

In the above description, the filter characteristic of the LF receiving unit 222 is changed by switching the connection state of the filter switch 2223, but the present disclosure is not limited to the above configuration. If the filter of the LF receiving unit 222 is configured as a digital filter, the filter characteristic switching unit G5 may switch the filter characteristic by changing a parameter corresponding to a filter coefficient of the digital filter.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. In addition, various modifications described below can be implemented by appropriately combining the multiple modifications together.

Members having the same functions as those described in the above embodiment are denoted by the same reference numerals, and a description of the same members are omitted in the following. When referring to only a part of the configuration, the configuration of the embodiment described above can be applied to other portions.

[Modification 1]

In the embodiments described above, a configuration has been disclosed in which the pass bandwidth of the bandpass filter included in the LF receiving unit 222 is widened so as to be affected by the electromagnetic wave emitted from the wireless charger 300. Therefore, the mobile device 200 is inhibited from returning the response signal to the relayed LF signal. However, the present disclosure is not limited to the above configuration. The mobile device-side control unit 210 may be configured not to return a response signal when the non-cooperative wireless charger 300 is wirelessly charged by a software control. In this example, an embodiment based on the above technical idea is disclosed as Modification 1.

Figure 13:
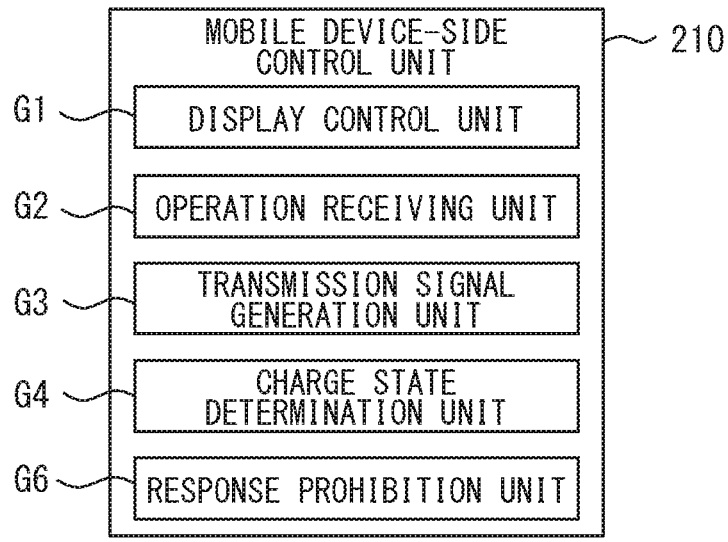
FIG. 13 is a functional block diagram of a mobile device-side control unit according to Modification 1.

As shown in FIG. 13, a mobile device-side control unit 210 according to the present modification includes a response prohibition unit G6 in addition to the display control unit G1, the operation receiving unit G2, the transmission signal generation unit G3, and the charge state determination unit G4. The functions of the display control unit G1, the operation receiving unit G2, the transmission signal generation unit G3, and the charge state determination unit G4 are described above.

However, the mobile device 200 according to the present modification includes a normal mode and a non-response mode as operation modes. The normal mode is an operation mode in which the transmission signal generation unit G3 generates a response signal corresponding to the LF signal received by the LF communication module 220, and outputs the response signal to the UHF communication module 230. The non-response mode is an operation mode in which the transmission signal generation unit G3 does not generate a response signal even when the LF communication module 220 receives an LF signal from the in-vehicle system 100. The operation mode of the mobile device 200 (for example, the transmission signal generation unit G3) is controlled by the response prohibition unit G6.

Figure 14:
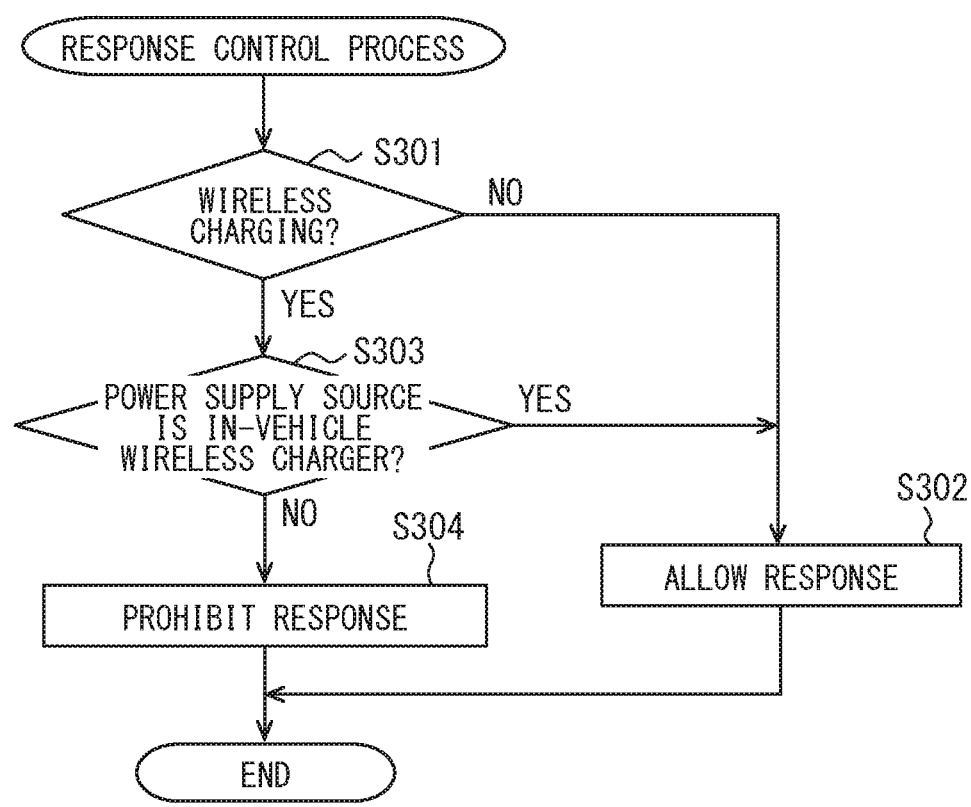
FIG. 14 is a flowchart of a response control process executed by a mobile device-side control unit according to Modification 1.

The response prohibition unit G6 is configured to control the operation mode of the mobile device 200 based on the execution state of the wireless charging. FIG. 14 is a flowchart illustrating the operation of the response prohibition unit G6. Hereinafter, the process executed by the response prohibition unit G6 is referred to as a response control process. The response control process may be performed sequentially (for example, every 200 milliseconds).

In S301, the charge state determination unit G4 determines whether the built-in battery 261 is being wirelessly charged based on signals input from the wireless charging receiver 262 in the same manner as in S201. If it is determined in S301 that the built-in battery 261 is not being wirelessly charged, S302 is executed. If it is determined in S301 that the built-in battery 261 is being wirelessly charged, S303 is executed.

In S302, the response prohibition unit G6 sets the operation mode of the mobile device-side control unit 210 to the normal mode. In other words, the response prohibition unit G6 sets the operation mode to a state in which generation and transmission of the response signal corresponding to the LF signal are permitted. When the operation mode of the mobile device-side control unit 210 is already the normal mode at the time of executing S302, the operation mode may be maintained.

In S303, the charge state determination unit G4 determines whether or not the power transmission source of the wireless power is the in-vehicle wireless charger 180 based on whether or not the vehicle charge notification signal is received from the in-vehicle system 100 when the wireless charging is started. When it is determined that the power transmission source is the in-vehicle wireless charger 180, S302 is executed, and the operation mode of the mobile device-side control unit 210 is set to the normal mode. When it is determined that the power transmission source is not the in-vehicle wireless charger 180, S304 is executed. In S304, the operation mode of the mobile device-side control unit 210 is set to the non-response mode. In other words, the setting is made so that the mobile device 200 does not return a response signal to the LF signal.

According to the configuration described above, similarly to the embodiments described above, the possibility can be reduced that the vehicle V is used illegally by the third party in the situation where the mobile device 200 is brought into the home.

The non-response mode may be an operation mode in which the mobile device 200 operates so as not to finally return a response signal in response to the LF signal from the in-vehicle system 100. For example, the mobile device 200 may be configured to discard the response signal generated by the transmission signal generation unit G3 without outputting the response signal to the UHF communication module 230. Therefore, it is possible to configure the non-response mode. In addition, the non-response mode may be configured by stopping the operation of the LF communication module 220 itself. The configuration described above corresponds to a configuration in which the operation of the LF receiving unit 222 is stopped during wireless charging in the non-cooperative wireless charger 300.

In the above description, the mobile device 200 controls the response signal so as not to return when the power transmission source is the non-cooperative wireless charger 300 after identifying whether the power source of the wireless power is the in-vehicle wireless charger 180 or the non-cooperative wireless charger 300, but the present disclosure is not limited to the above configuration. The mobile device 200 may be configured so as not to return a response signal during wireless charging without identifying whether the wireless power transmission source is the in-vehicle wireless charger 180 or the non-cooperative wireless charger 300.

[Modification 2]

The mobile device 200 may be configured to be rechargeable by adopting a predetermined power feeder cable such as a USB cable. The mobile device 200 may be configured so as not to return a response signal based on being charged by the power feeder cable (hereinafter, wired charging). since the situation in which the mobile device 200 is brought to the home is assumed as the situation for charging the mobile device 200 by wire, even when the mobile device 200 is configured so as not to transmit the response signal while being charged by wire, the possibility can be reduced that the vehicle V is illegally used by the third party in a situation where the mobile device 200 is brought to the home. In this example, a configuration based on the above technical idea is disclosed as Modification 2.

Figure 15:
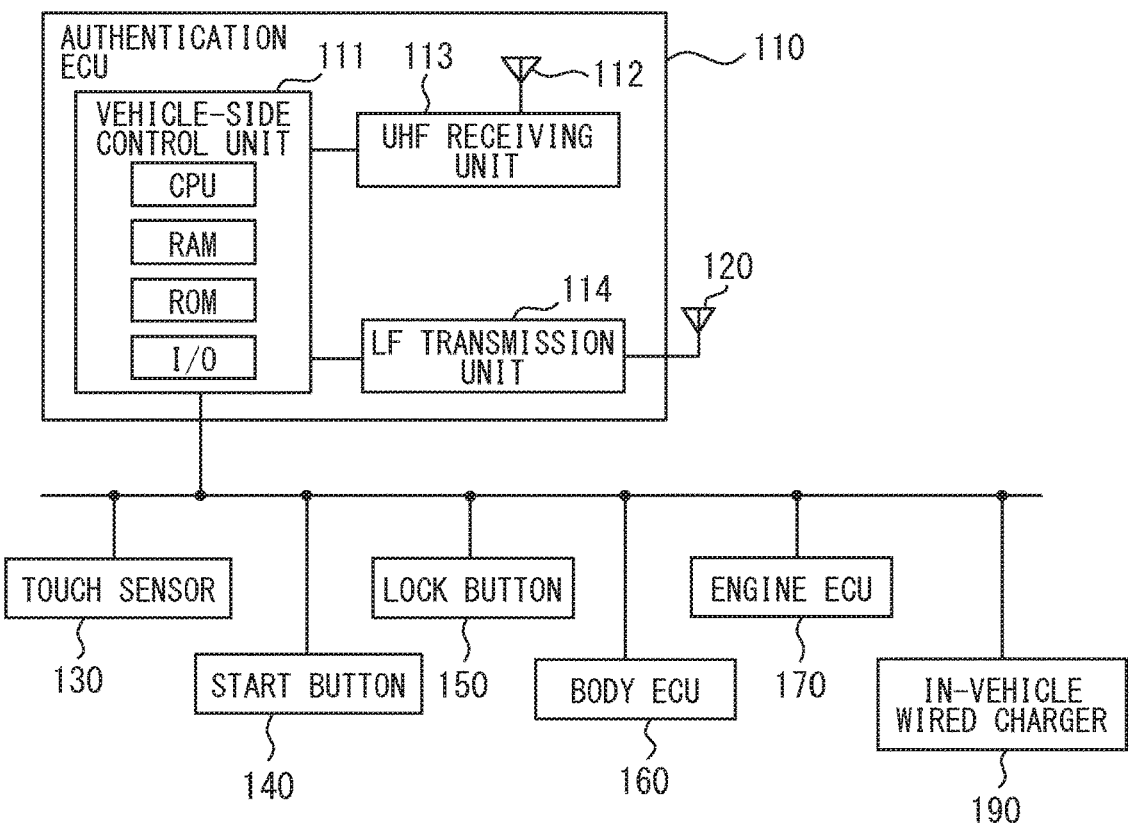
FIG. 15 is a block diagram showing a configuration of an in-vehicle system according to Modification 2.

As shown in FIG. 15, the in-vehicle system 100 according to Modification 2 includes an in-vehicle wired charger 190. The in-vehicle wired charger 190 is a facility that is electrically connected to a power supply line built in the vehicle V, for feeding an electric power supplied from an in-vehicle power supply such as an in-vehicle battery or an alternator to the mobile device 200. The in-vehicle wired charger 190 includes a power feeder cable that conform to a predetermined standard such as USB Type-C, for example. The in-vehicle wired charger 190 corresponds to a power supply device and an in-vehicle charger.

The in-vehicle wired charger 190 is also configured to communicate with the authentication ECU 110, and when detecting that the mobile device 200 is connected to the power feeder cable, outputs the fact to the authentication ECU 110. The power feeder cable may be configured not only to supply an electric power but also to enable a data communication. According to the configuration described above, the authentication ECU 110 and the mobile device 200 can also be authenticated by a data communication through the power feeder cables.

According the present modification, when the power transmission control unit F6 detects that the mobile device 200 is being charged by the in-vehicle wired charger 190 based on a signal input from the in-vehicle wired charger 190, the power transmission control unit F6 transmits a vehicle charge notification signal indicating that a device supplying the electric power to the mobile device 200 is the in-vehicle wired charger 190 to the mobile device 200 in cooperation with the LF transmission unit 114. Upon receiving the vehicle charge notification signal, the mobile device 200 can recognize that the power supply source for charging the built-in battery 261 is the in-vehicle wired charger 190.

The timing of transmitting the vehicle charge notification signal may be appropriately designed, for example, may be set to a time when the in-vehicle wired charger 190 is connected to the mobile device 200, or fall within a predetermined time (for example, 1 sec) immediately after being connected to the mobile device 200. The vehicle charge notification signal may be configured to be transmitted before the power transmission to the mobile device 200 is started.

Figure 16:
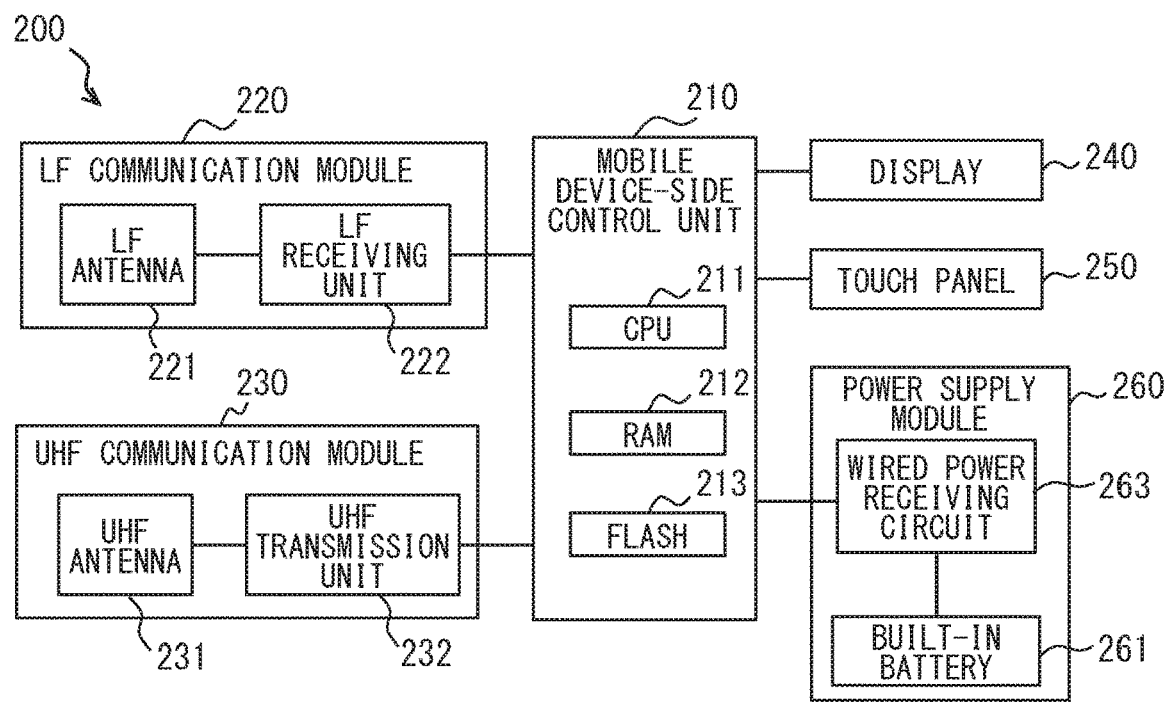
FIG. 16 is a functional block diagram of a mobile device-side control unit according to Modification 2.

As shown in FIG. 16, the mobile device 200 according to the present modification includes a wired power receiving circuit 263 as a component of the power supply module 260. The wired power receiving circuit 263 is a circuit module for supplying the electric power input from the power feeder cable to the built-in battery 261 to charge the built-in battery 261. The wired power receiving circuit 263 corresponds to a charging unit or a charger, in particular, a wired charging unit or a wired charger. The wired power receiving circuit 263 includes a connector for connecting to a terminal of the power feeder cable, a voltage detection circuit for detecting a voltage, a rectifier circuit, an IC for controlling charging of the built-in battery 261, and the like. When the wired power receiving circuit 263, starts charging the built-in battery 261 by being connected to the power feeder cable, the wired power receiving circuit 263 outputs a control signal indicating that the built-in battery 261 is being charged by wire to the mobile device-side control unit 210.

The power supply source when the mobile device 200 is charged by wire is not limited to the in-vehicle wired charger 190. According to the configuration in which the mobile device 200 includes the wired power receiving circuit 263 as described above, the user can charge the built-in battery 261 of the mobile device 200 even at home or the like by adopting a predetermined power feeder cable.

The mobile device-side control unit 210 according to the present modification includes a display control unit G1, an operation receiving unit G2, a transmission signal generation unit G3, a charge state determination unit G4, and a response prohibition unit G6, similarly to Modification 1. The charge state determination unit G4 according to the present modification determines whether the wired charging is in progress based on a signal input from the wired power receiving circuit 263. When the wired power receiving circuit 263 is executing the wired charging, the charge state determination unit G4 determines whether or not the power supply source of the electric power received by the wired power receiving circuit 263 (in other words, the connection destination of the power feeder cable) is the in-vehicle wired charger 190 based on whether the vehicle charge notification signal from the in-vehicle system 100 is received at the charging start time point.

The response prohibition unit G6 is configured to control the operation mode of the mobile device-side control unit 210 based on the determination result of the charge state determination unit G4, that is, the wired charging execution state of the built-in battery 261 by the wired power receiving circuit 263. When the charge state determination unit G4 determines that the built-in battery 261 is being charged by wire, the response prohibition unit G6 sets the operation mode of the mobile device-side control unit 210 to the normal mode. In other words, the mobile device 200 set a response signal corresponding to the LF signal to a returnable state. Even when it is determined by the charge state determination unit G4 that the built-in battery 261 is being charged with the electric power supplied from the in-vehicle wired charger 190, the wired power receiving circuit 263 sets the operation mode of the mobile device-side control unit 210 to the normal mode.

When it is determined by the charge state determination unit G4 that the wired power receiving circuit 263 is charging the built-in battery 261 with the electric power supplied from a power supply other than the in-vehicle wired charger 190, the operation mode of the mobile device-side control unit 210 is set to the non-response mode. In other words, when the mobile device 200 is being charged by wire at home or the like, the mobile device 200 is set so as not to return a response signal to the LF signal.

According to the configuration described above, similarly to the embodiments described above, the possibility can be reduced that the vehicle V is used illegally by the third party in the situation where the mobile device 200 is brought into the home. When the built-in battery 261 of the mobile device 200 is being charged by wire with a power supply line disposed in a facility such as a home as a power supply source, the possibility of the user using the vehicle V is low. Therefore, the possibility that the user's convenience is impaired by the above control can be reduced.

As mentioned in Modification 1, the non-response mode may be an operation mode in which the mobile device 200 does not finally return a response signal. In the non-response mode, the mobile device 200 may be configured to discard the response signal generated by the transmission signal generation unit G3 without outputting the response signal to the UHF communication module 230. The mobile device 200 may be configured to stop the operation of the LF communication module 220 itself in the non-response mode. Stopping the operation of the LF communication module 220 itself corresponds to not receiving an LF signal.

The above description mentions that the mobile device 200 controls the response signal not to be returned when the power supply source is not the in-vehicle wired charger 190 after identifying whether or not the power supply source is the in-vehicle wired charger 190, but the present disclosure is not limited to the above configuration. The mobile device 200 may be configured not to return a response signal during wired charging without identifying whether the power supply source is the in-vehicle wired charger 190.

[Modification 3]

In connection with Modification 2, even when the mobile device 200 is being charged by wire other than the in-vehicle wired charger 190, the mobile device 200 is not always charged by wire with the use of a wiring plug-in connector (so-called outlet) disposed in a facility such as a home. The mobile device 200 may be charged by wire with the use of a portable mobile battery. The mobile battery also corresponds to a power supply device.

In the situation where the built-in battery 261 of the mobile device 200 is being charged by wire with a wiring plug-in connector disposed in a facility such as a home as a power supply source, since the mobile device 200 is brought into the facility as described above, the possibility of the user immediately using the vehicle V is low. Therefore, it may not be necessary for the mobile device 200 to maintain a state in which the mobile device 200 can respond to the LF signal from the in-vehicle system 100.

However, when the built-in battery 261 of the mobile device 200 is being charged by wire with the mobile battery as the power supply source, the mobile device 200 is not necessarily stored in the facility. The possibility that the user uses the vehicle V is relatively high. Accordingly, user's convenience may be compromised if the mobile device is also set to non-response mode even when the built-in battery 261 of the mobile device 200 is being charged by wire with the mobile battery as a power supply source. The configuration disclosed below as Modification 3 focuses on the above-mentioned points, and the following describes a specific configuration of Modification 3.

Figure 17:
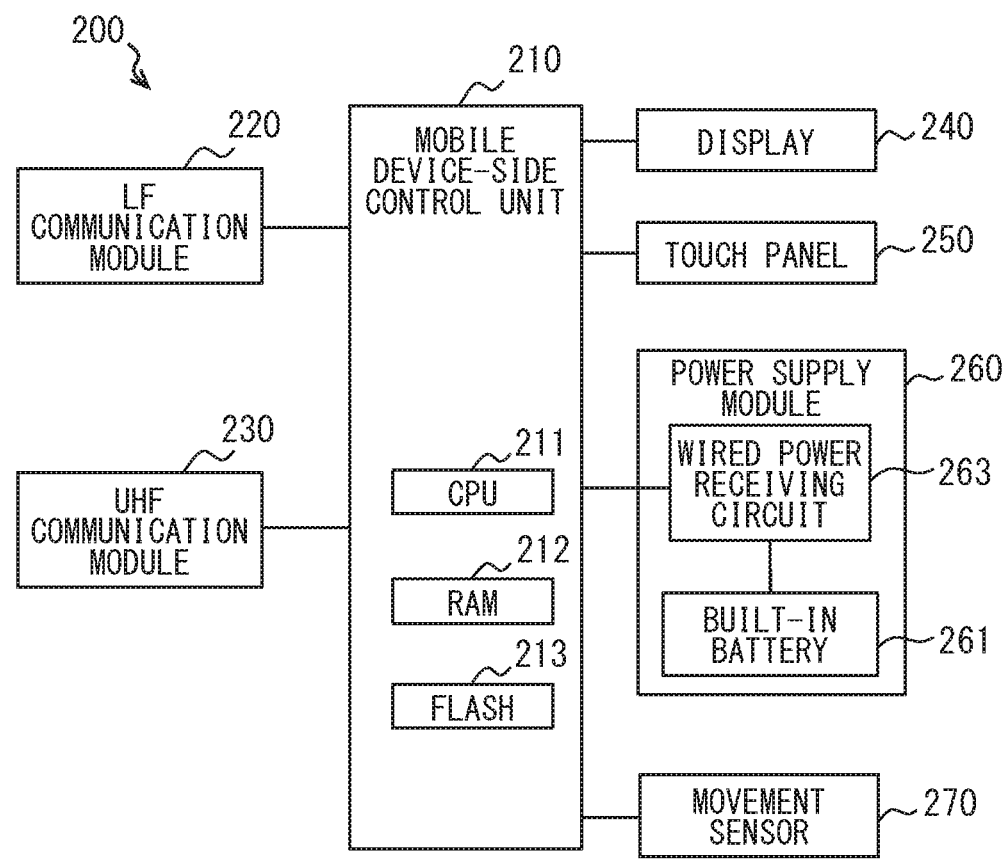
FIG. 17 is a block diagram showing a configuration of a mobile device according to Modification 3.

The mobile device 200 according to Modification 3 includes a movement sensor 270 as shown in FIG. 17. The movement sensor 270 is a sensor for detecting that the mobile device 200 (and the user) is moving. When the user is moving, acceleration caused by the user's movement acts on the mobile device 200. The movement sensor 270 may be configured by adopting, for example, an acceleration sensor. As the acceleration sensor as the movement sensor 270, for example, a three-axis acceleration sensor that detects acceleration in each of three mutually orthogonal axial directions can be adopted. The acceleration sensor as the movement sensor 270 may be a two-axis acceleration sensor or a one-axis acceleration sensor. An output signal of the movement sensor 270 is sequentially input to the mobile device-side control unit 210.

The movement sensor 270 may be a gyro sensor or a geomagnetic sensor. Any sensor that detects a change in a physical state amount caused by the movement of the user can be adopted. The movement sensor 270 may be a switch element configured to change (in other words, vibrate) a contact state of a movable contact with a fixed contact by relatively weak vibration such as walking of the user. The output of the switch element outputs a pulsed signal because the terminals repeatedly contact with and detach from each other when the user is walking while carrying the mobile device 200. When the mobile device 200 is placed in a stable place such as a desk, a shelf, or the like, a contact state between the terminals is stabilized in one of contact and non-contact, so that a pulse signal is not output. In other words, the switch element described above can also be adopted as the movement sensor 270.

The mobile device-side control unit 210 according to the present modification includes a display control unit G1, an operation receiving unit G2, a transmission signal generation unit G3, and a response prohibition unit G6, similarly to the Modification 2. When the response prohibition unit G6 according to the present modification determines that the built-in battery 261 is being charged by wire and the power supply source is not the in-vehicle wired charger 190, the response prohibition unit G6 further determines whether the mobile device 200 is moving based on the output signal of the movement sensor 270. The response prohibition unit G6 according to the present modification sets the operation mode of the mobile device-side control unit 210 to a non-response mode when the response prohibition unit G6 determines that the built-in battery 261 is being charged by wire, the power supply source is not the in-vehicle wired charger 190, and the mobile device 200 is not moving (in other words, is stationary) based on the output signal of the movement sensor 270. Even when the response prohibition unit G6 determines that the built-in battery 261 is being charged by wire and the power supply source is not the in-vehicle wired charger 190, if the response prohibition unit G6 determines that the mobile device 200 is moving based on the output signal of the movement sensor 270, the response prohibition unit G6 sets the operation mode of the mobile device-side control unit 210 to a normal mode.

According to the above configuration, when the user uses the vehicle V while charging the mobile device 200 by wire with the mobile battery, it is possible to reduce the possibility that the smart function does not operate.

[Modification 4]

Figure 18:
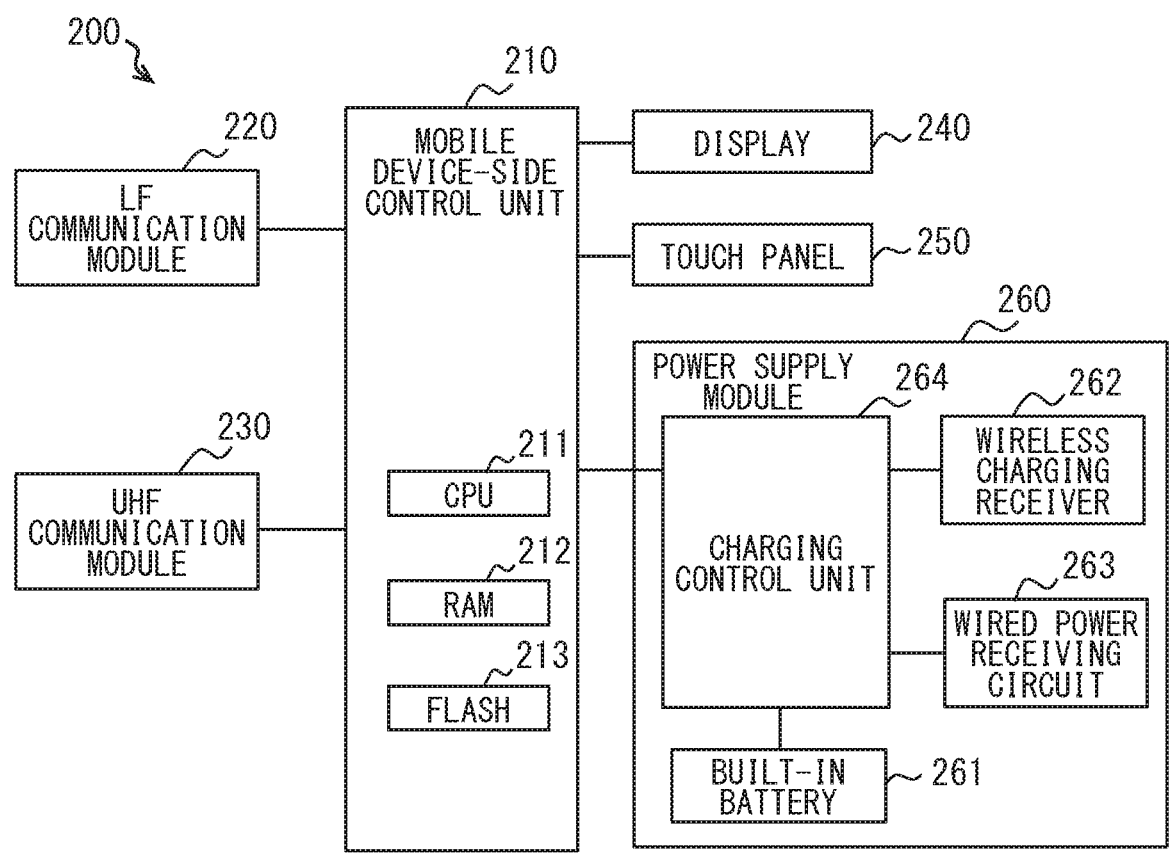
FIG. 18 is a block diagram showing a configuration of a mobile device according to Modification 4.

The various embodiments and modifications described above may be implemented in any suitable combination. For example, as shown in FIG. 18, the mobile device 200 may include both the wireless charging receiver 262 and the wired power receiving circuit 263. When both the wireless charging receiver 262 and the wired power receiving circuit 263 are provided, those members may be connected to the built-in battery 261 and the mobile device-side control unit 210 through the charging control unit 264.

The charging control unit 264 is configured to arbitrate the operation of the wireless charging receiver 262 and the wired power receiving circuit 263. For example, the charging control unit 264 stops the wireless charging receiver 262 when charging is performed by the wired power receiving circuit 263. When a power feeder cable is inserted into the wired power receiving circuit 263 in a state where charging is being performed by the wireless charging receiver 262, the wireless charging receiver 262 is stopped and charging by the wired power receiving circuit 263 is preferentially executed. In other words, the wired charging is performed preferentially over the wireless charging. Generally, the wire charging has a higher charging efficiency than the wireless charging, so that the built-in battery 261 of the mobile device 200 can be efficiently charged according to the above configuration.

[Modification 5]

In the embodiments described above, the mobile device 200 is a multi-function mobile device including the display 240, but the present disclosure is not limited to the above mobile device. The mobile device 200 may not include a display. However, the configuration in which the mobile device 200 is provided with a display, since the power consumption is greater than the configuration without a display, there is a high need to charge the built-in battery 261. Further, the embodiments and the like described above are more preferable as the charge frequency of the mobile device 200 is higher. In other words, the embodiments and the like described above are more suitable for a mobile device having the display 240 and providing various functions. The mobile device 200 can be applied to a general-purpose mobile terminal configured to receive an LF signal. A general-purpose mobile terminal refers to a portable information processing device capable of installing and executing various application software such as a smartphone or a wearable device.

What is claimed is:

1. A mobile device configured to wirelessly communicate with a vehicle device mounted on a vehicle, comprising:
a receiving unit configured to receive a response request signal transmitted from the vehicle device by adopting a radio wave at a predetermined vehicle transmission frequency;
a response signal generation unit configured to generate a response signal in response to the response request signal based on the response request signal received by the receiving unit;
a transmission unit configured to transmit the response signal generated by the response signal generation unit;
a charging unit configured to charge a built-in battery with an electric power supplied wirelessly or through wire from a power supply device; and
a charge state determination unit configured to determine whether the charging unit is charging the built-in battery,
wherein the mobile device is configured not to transmit the response signal, in a situation where the charge state determination unit determines that the charging unit is charging the built-in battery,
wherein the charging unit includes a wireless charging unit configured to charge the built-in battery with the electric power wirelessly transmitted from the power supply device by adopting an electromagnetic wave at a predetermined charge frequency,
wherein the receiving unit includes:
a reception antenna configured to receive a radio wave at the vehicle transmission frequency and a radio wave at the charge frequency; and
a filter unit configured to pass a signal component having a predetermined frequency band among signals received by the reception antenna, and further configured to execute switchover between a first filter characteristic for passing a signal at the vehicle transmission frequency while blocking a signal at the charge frequency, and a second filter characteristic for passing the signal at the vehicle transmission frequency and the signal at the charge frequency, and
wherein the mobile device further includes a filter characteristic switching unit configured to:
set the filter characteristics of the receiving unit to the second filter characteristic in a situation where the charge state determination unit determines that the wireless charging unit is charging the built-in battery; and
set the filter characteristics of the receiving unit to the first filter characteristic in a situation where the charge state determination unit determines that the wireless charging unit is not charging the built-in battery.

2. The mobile device according to claim 1, wherein the response signal generation unit is configured not to generate the response signal, in a situation where the charge state determination unit determines that the wireless charging unit is charging the built-in battery.

3. The mobile device according to claim 1, wherein the mobile device is configured to stop an operation carried out by the receiving unit, in a condition that the charge state determination unit determines that the wireless charging unit is charging the built-in battery.

4. The mobile device according to claim 1, wherein the charge state determination unit is configured to identify whether the power supply device is an in-vehicle charger based on a vehicle charge notification signal, which is transmitted from the vehicle device and indicates that the power supply device is the in-vehicle charger mounted on the vehicle, and wherein the mobile device is configured to transmit the response signal even though the charge state determination unit determines that the charging unit is charging the built-in battery, in a situation where the power supply device is the in-vehicle charger.

5. A mobile device configured to wirelessly communicate with a vehicle device mounted on a vehicle, comprising:
a receiving unit configured to receive a response request signal transmitted from the vehicle device by adopting a radio wave at a predetermined vehicle transmission frequency;
a response signal generation unit configured to generate a response signal in response to the response request signal based on the response request signal received by the receiving unit;
a transmission unit configured to transmit the response signal generated by the response signal generation unit;
a charging unit configured to charge a built-in battery with an electric power supplied wirelessly or through wire from a power supply device;
a charge state determination unit configured to determine whether the charging unit is charging the built-in battery; and
a movement sensor configured to detect that the mobile device is moving,
wherein the mobile device is configured not to transmit the response signal, in a situation where the charge state determination unit determines that the charging unit is charging the built-in battery,
wherein the charging unit includes a wired charging unit configured to charge the built-in battery with an electric power supplied from the power supply device through a power feeder cable,
wherein the mobile device is configured not to transmit the response signal, in a situation in which the charge state determination unit determines that the wired charging unit is charging the built-in battery, and
wherein the mobile device is configured to transmit the response signal even though the charge state determination unit determines that the wired charging unit is charging the built-in battery, in a situation where the movement sensor detects that the mobile device is moving.

6. The mobile device according to claim 4,
wherein the response signal generation unit is configured not to generate the response signal, in a situation in which the charge state determination unit determines that the wired charging unit is charging the built-in battery.

7. The mobile device according to claim 4,
wherein the mobile device is configured to stop an operation carried out by the receiving unit, in a condition that the charge state determination unit determines that the wired charging unit is charging the built-in battery.

8. A vehicle electronic key system comprising:
a vehicle device mounted on a vehicle; and
a mobile device which is associated with the vehicle device and carried by a user of the vehicle
wherein the vehicle device performs a predetermined vehicle control on the vehicle based on a successful authentication process by a wireless communication between the vehicle device and the mobile device,
wherein the mobile device includes:
a receiver configured to receive a response request signal transmitted from the vehicle device;
a response signal generator configured to generate a response signal in response to the response request signal based on the response request signal received by the receiver;
a transmitter configured to transmit the response signal generated by the response signal generator;
a charger configured to charge a built-in battery with an electric power supplied wirelessly or through wire from a power supply device; and
a charge state determiner configured to determine whether the charger charges the built-in battery,
wherein the vehicle device includes:
a vehicle-side transmitter configured to transmit a signal which includes the response request signal and is directed to the mobile device;
a vehicle-side receiver configured to receive the response signal;
an in-vehicle charger configured as the power supply device; and
a power transmission controller configured to detect whether the in-vehicle charger is supplying the electric power to the mobile device, and transmit a vehicle charge notification signal toward the mobile device in cooperation with the vehicle-side transmitter, in response to detecting that the in-vehicle charger is supplying the electric power to the mobile device, the vehicle charge notification signal indicating that the power supply device is the in-vehicle charger,
wherein the charge state determiner of the mobile device is further configured to identify whether the power supply device is the in-vehicle charger based on the vehicle charge notification signal transmitted from the vehicle device, in a situation where the charge state determiner of the mobile device determines that the charger is charging the built-in battery, and
wherein the mobile device is configured to:
transmit the response signal in a situation where the charge state determination unit determines that the power supply device is the in-vehicle charger and determines that the charger is charging the built-in battery; and
not to transmit the response signal in a situation where the charge state determination unit determines that the power supply device is not the in-vehicle charger.

* * * * *